US009394483B2

(12) United States Patent
Wu et al.

(10) Patent No.: US 9,394,483 B2
(45) Date of Patent: Jul. 19, 2016

(54) FLAME RETARDANT POLYCARBONATE COMPOSITIONS, METHODS OF MANUFACTURE THEREOF AND ARTICLES COMPRISING THE SAME

(71) Applicant: SABIC Innovative Plastics IP B.V., Bergen op Zoom (NL)

(72) Inventors: Tong Wu, Shanghai (CN); Yegang Lin, Shanghai (CN); Ying Li, Shanghai (CN)

(73) Assignee: SABIC GLOBAL TECHNOLOGIES B.V. (NL)

(*) Notice: Subject to any disclaimer, the term of this patent is extended or adjusted under 35 U.S.C. 154(b) by 0 days.

(21) Appl. No.: 13/901,388

(22) Filed: May 23, 2013

(65) Prior Publication Data
US 2013/0317144 A1 Nov. 28, 2013

Related U.S. Application Data

(60) Provisional application No. 61/651,487, filed on May 24, 2012, provisional application No. 61/651,481, filed on May 24, 2012.

(51) Int. Cl.
C08K 5/5399 (2006.01)
C08K 3/22 (2006.01)
C08L 69/00 (2006.01)
C09K 21/14 (2006.01)
C08K 7/02 (2006.01)
C08K 7/14 (2006.01)
C08L 67/02 (2006.01)
C08L 83/10 (2006.01)
C08G 77/448 (2006.01)

(52) U.S. Cl.
CPC . C09K 21/14 (2013.01); C08K 3/22 (2013.01); C08K 5/5399 (2013.01); C08K 7/02 (2013.01); C08K 7/14 (2013.01); C08L 67/02 (2013.01); C08L 69/00 (2013.01); C08L 69/005 (2013.01); C08L 83/10 (2013.01); C08G 77/448 (2013.01); C08L 2205/02 (2013.01)

(58) Field of Classification Search
CPC combination set(s) only.
See application file for complete search history.

(56) References Cited

U.S. PATENT DOCUMENTS

| 3,792,117 | A | 2/1974 | Kolodchin et al. |
| 3,859,249 | A | 1/1975 | McNeely |
| 3,865,783 | A | 2/1975 | Clutter |
| 4,042,561 | A | 8/1977 | DeEdwardo et al. |
| 4,111,883 | A | 9/1978 | Mark |
| 4,117,041 | A | 9/1978 | Guschl |
| 5,174,923 | A | 12/1992 | Chen et al. |
| 5,605,980 | A | 2/1997 | Boutni |
| 5,856,380 | A | 1/1999 | Bauer et al. |
| 5,965,627 | A | 10/1999 | Allcock et al. |
| 6,403,755 | B1 | 6/2002 | Stewart et al. |
| 6,433,082 | B1 | 8/2002 | Eckel et al. |
| 6,528,559 | B1 | 3/2003 | Nakacho et al. |
| 6,562,887 | B1 | 5/2003 | Kurasawa et al. |
| 6,596,893 | B2 | 7/2003 | Nakacho et al. |
| 6,613,822 | B1 | 9/2003 | Eckel |
| 6,630,524 | B1 * | 10/2003 | Lim et al. ...................... 524/100 |
| 6,632,891 | B1 | 10/2003 | Tada et al. |
| 6,723,864 | B2 | 4/2004 | Silva et al. |
| 6,727,312 | B1 | 4/2004 | Nodera |
| 6,737,453 | B2 | 5/2004 | Sumimoto et al. |
| 6,747,078 | B1 | 6/2004 | Eckel et al. |
| 6,790,886 | B2 | 9/2004 | Harashina et al. |
| 6,790,887 | B1 | 9/2004 | Nishihara |
| 6,946,578 | B2 | 9/2005 | Nakano et al. |
| 6,949,596 | B2 | 9/2005 | Seidel et al. |
| 6,969,745 | B1 | 11/2005 | Taraiya et al. |
| 7,094,819 | B2 | 8/2006 | Kakegawa et al. |
| 7,169,534 | B2 | 1/2007 | Baumann et al. |
| 7,169,836 | B2 | 1/2007 | Harashina et al. |
| 7,247,666 | B2 | 7/2007 | Urabe et al. |
| 7,317,046 | B2 | 1/2008 | Fukuoka et al. |
| 7,341,783 | B2 | 3/2008 | Tokiwa |
| 7,365,815 | B2 | 4/2008 | Hino et al. |
| 7,462,662 | B2 * | 12/2008 | Balfour et al. ................. 524/165 |

(Continued)

FOREIGN PATENT DOCUMENTS

CA 2335948 A1 * 1/2000
CN 101142089 A * 3/2008

(Continued)

OTHER PUBLICATIONS

Machine Translation of CN101142089A. Mar. 12, 2008.*
UL 94 AppGuide. MG Chemicals. http://www.mgchemicals.com/downloads/appguide/appguide1105.pdf. As viewed on Dec. 1, 2014.*
JP 2007-070468 A—Mar. 22, 2007—Machine translation.
KR 10-0435571 B1—Jan. 29, 2003—Machine Translation.
KR 10-435571 B1—Jan. 29, 2003—Abstract Only.
International Search Report for International Application No. PCT/IB2013/054306; International filing date May 24, 2013; Issued Dec. 13, 2013. (7 pages).
Written Opinion for International Application No. PCT/IB2013/054306; International filing date May 24, 2013; Issued Dec. 13, 2013. (11 pages).
Written Opinion for International Application No. PCT/US2013/042603; International filing date May 5, 2013; Issued Sep. 11, 2013. (7 pages).

(Continued)

Primary Examiner — Robert C Boyle
Assistant Examiner — Stephen Rieth
(74) Attorney, Agent, or Firm — Cantor Colburn LLP

(57) ABSTRACT

Disclosed herein is a flame retardant composition comprising 20 to 80 weight percent of a polycarbonate; 1 to 20 weight percent of a laser activatable additive; the laser activatable additive being operative to plate the flame retardant composition upon being activated by a laser; and 1 to 20 weight percent of a phosphazene compound; where all weight percents are based on the total weight of the flame retardant composition. Disclosed herein too is a method comprising blending 20 to 80 weight percent of a polycarbonate; 1 to 20 weight percent of a laser activatable additive; the laser activatable additive being operative to plate the flame retardant composition upon being activated by a laser; and 1 to 20 weight percent of a phosphazene compound to produce a flame retardant composition; where all weight percents are based on the total weight of the flame retardant composition; and extruding the flame retardant composition.

20 Claims, No Drawings

(56) References Cited

U.S. PATENT DOCUMENTS

| | | | |
|---|---|---|---|
| 7,468,408 B2 | 12/2008 | Onishi et al. | |
| 7,531,664 B2 | 5/2009 | Troutman et al. | |
| 7,659,332 B2 | 2/2010 | Kang et al. | |
| 7,691,924 B2 | 4/2010 | Lim et al. | |
| 7,695,815 B2 | 4/2010 | Agarwal et al. | |
| 7,759,418 B2 | 7/2010 | Murakami et al. | |
| 7,767,736 B2 | 8/2010 | Baran, Jr. | |
| 7,799,855 B2 | 9/2010 | Ebeling et al. | |
| 7,863,382 B2 | 1/2011 | Ishii et al. | |
| 7,915,441 B2 | 3/2011 | Fushimi | |
| 7,985,788 B2 | 7/2011 | Shinagawa et al. | |
| 8,039,132 B2 | 10/2011 | Shimizu et al. | |
| 8,053,500 B2 | 11/2011 | Morimoto et al. | |
| 8,058,333 B1 | 11/2011 | Chang et al. | |
| 8,063,245 B2 | 11/2011 | Okada et al. | |
| 8,399,546 B2 | 3/2013 | Li et al. | |
| 2002/0193027 A1 | 12/2002 | Dana et al. | |
| 2003/0083442 A1 | 5/2003 | Nishihara et al. | |
| 2003/0109612 A1 | 6/2003 | Seidel et al. | |
| 2004/0039145 A1 | 2/2004 | Silva et al. | |
| 2005/0182165 A1 | 8/2005 | Ma et al. | |
| 2005/0228087 A1 | 10/2005 | Murakami et al. | |
| 2005/0245670 A1 | 11/2005 | Sato | |
| 2005/0261396 A1 | 11/2005 | Ermi et al. | |
| 2006/0079612 A1 | 4/2006 | Troutman et al. | |
| 2006/0205848 A1 | 9/2006 | Siripurapu | |
| 2006/0223913 A1 | 10/2006 | Osada | |
| 2006/0276582 A1 | 12/2006 | Mochizuki et al. | |
| 2006/0293414 A1* | 12/2006 | Gorny et al. | 523/200 |
| 2007/0040154 A1* | 2/2007 | Murakami | 252/609 |
| 2007/0149661 A1 | 6/2007 | Charati et al. | |
| 2007/0155873 A1 | 7/2007 | Kang et al. | |
| 2007/0191518 A1 | 8/2007 | Chen et al. | |
| 2008/0119596 A1 | 5/2008 | Agarwal | |
| 2008/0188597 A1 | 8/2008 | Moriyama et al. | |
| 2009/0023351 A1 | 1/2009 | Kashihara et al. | |
| 2009/0292048 A1* | 11/2009 | Li et al. | 524/115 |
| 2010/0036054 A1 | 2/2010 | Hutchings et al. | |
| 2010/0129649 A1 | 5/2010 | Malinoski et al. | |
| 2010/0139944 A1 | 6/2010 | Guo et al. | |
| 2010/0152344 A1 | 6/2010 | van den Bogerd et al. | |
| 2010/0222244 A1 | 9/2010 | Maccone et al. | |
| 2010/0233486 A1 | 9/2010 | Inoue et al. | |
| 2010/0261818 A1 | 10/2010 | Seki | |
| 2011/0086225 A1 | 4/2011 | Takagi et al. | |
| 2011/0118395 A1 | 5/2011 | Kiuchi et al. | |
| 2011/0130497 A1 | 6/2011 | Su et al. | |
| 2011/0136979 A1 | 6/2011 | Cogen et al. | |
| 2011/0172423 A1 | 7/2011 | Fuchs et al. | |
| 2011/0218278 A1 | 9/2011 | Ikuno et al. | |
| 2011/0257296 A1 | 10/2011 | LaPointe et al. | |
| 2012/0021202 A1 | 1/2012 | Senda et al. | |
| 2012/0028047 A1 | 2/2012 | Imai et al. | |
| 2012/0252945 A1 | 10/2012 | Yamaguchi et al. | |
| 2013/0066002 A1 | 3/2013 | Kawai | |
| 2013/0131241 A1 | 5/2013 | van de Grampel et al. | |
| 2013/0137801 A1 | 5/2013 | Ha et al. | |
| 2013/0224462 A1 | 8/2013 | Van Der Mee et al. | |
| 2013/0313419 A1 | 11/2013 | Nakazawa et al. | |

FOREIGN PATENT DOCUMENTS

| | | |
|---|---|---|
| CN | 1795238 B | 6/2010 |
| DE | 4433072 A1 | 3/1996 |
| DE | 10196566 B4 | 7/2008 |
| DE | 10393198 B4 | 6/2010 |
| DE | 10392639 B4 | 9/2010 |
| DE | 112004002030 B4 | 12/2010 |
| EP | 00064752 B1 | 11/1982 |
| EP | 214351 B1 | 3/1987 |
| EP | 246620 A2 * | 11/1987 |
| EP | 304296 B1 | 2/1989 |
| EP | 0376021 B1 | 7/1990 |
| EP | 0421747 B1 | 4/1991 |
| EP | 528113 B1 | 2/1993 |
| EP | 0728811 B1 | 8/1996 |
| EP | 562517 B1 | 8/1997 |
| EP | 806451 A1 | 11/1997 |
| EP | 0945478 A1 | 9/1999 |
| EP | 1069154 A1 | 1/2001 |
| EP | 1104766 A4 | 6/2001 |
| EP | 1548065 A1 | 6/2005 |
| EP | 1548065 B1 | 6/2005 |
| EP | 1603175 B1 | 11/2009 |
| EP | 1799766 B1 | 6/2010 |
| EP | 1927151 B1 | 8/2011 |
| EP | 2390282 A1 | 11/2011 |
| GB | 1598819 A | 9/1981 |
| JP | 08081620 A | 3/1996 |
| JP | 2001002908 A | 1/2001 |
| JP | 2002194197 A | 7/2002 |
| JP | 2007045906 A | 2/2007 |
| JP | 2007070468 A | 3/2007 |
| JP | 2007211154 A | 8/2007 |
| JP | 2012001580 A | 1/2012 |
| JP | 2012111925 A | 6/2012 |
| KR | 10-0435571 B1 | 1/2003 |
| KR | 20030008811 A | 1/2003 |
| KR | 20100070036 A | 6/2010 |
| WO | WO9910429 A1 | 3/1999 |
| WO | 03020827 A1 | 3/2003 |
| WO | 2004007611 A1 | 1/2004 |
| WO | WO2005019231 A1 | 3/2005 |
| WO | WO2005073264 A1 | 8/2005 |
| WO | WO2006096033 A | 9/2006 |
| WO | 2009141799 A1 | 11/2009 |
| WO | 2010028785 A1 | 3/2010 |
| WO | WO2010053167 A1 | 5/2010 |
| WO | WO2010087193 A1 | 8/2010 |
| WO | 2010101041 A1 | 9/2010 |
| WO | WO2010144615 A2 | 2/2011 |
| WO | WO2011090211 A1 | 7/2011 |
| WO | WO2011090215 A1 | 7/2011 |
| WO | WO2011118102 A1 | 9/2011 |
| WO | WO2011122080 A1 | 10/2011 |
| WO | WO2011125906 A1 | 10/2011 |
| WO | WO2011136379 A | 11/2011 |
| WO | WO2011149030 A1 | 12/2011 |
| WO | WO2011155119 A1 | 12/2011 |
| WO | 2012015109 A1 | 2/2012 |
| WO | 2012058821 A1 | 5/2012 |
| WO | WO2013100606 A1 | 7/2013 |
| WO | 2013115151 A1 | 8/2013 |

OTHER PUBLICATIONS

XP002712333 Database WPI Week 201205; Thomson Scientific, London, AN 2012-A16221—Jun. 15, 2010 (2 pages).
XP002712334 Database WPI Week 201058; Thomson Scientific, London, GB, AN 2010-H97109—Dec. 17, 2008 (2 pages).
XP002713617 Database WPI Week 201205—Thomson Scientific, London, GB; AN-2012-A16221—Jun. 15, 2010 (2 pages).
XP002713951 Database WPI Week 200340; Thomson Scientific, London, GB, AN 2003-427670 Jan. 29, 2003 (2 pages).
XP002713952 Database WPI Week 200732; Thomson Scientific, London, GB, AN 2007-336264—Feb. 22, 2007 (4 pages).
Invitation to Pay Additional Fees for International Application No. PCT/IB2013/054306; International filing date May 24, 2013; Issued Oct. 18, 2013 (8 pages).
Invitation to Pay Additional Fees for International Application No. PCT/IB2013/054315; International filing date May 24, 2013; Issued Oct. 9, 2013 (6 pages).
International Search Report for International Application No. PCT/IB2013/054316; International filing date May 24, 2013; Issued Oct. 4, 2013. (5 pages).
International Search Report for International Application No. PCT/IB2013/054322; International Filing Date May 24, 2013; Issued Sep. 20, 2013 (5 pgs).
International Search Report for International Application No. PCT/IB2013/054323, International Filing date May 24, 2013; Issued Oct. 17, 2013 (4 pages).

(56) References Cited

OTHER PUBLICATIONS

International Search Report for International Application No. PCT/IB2013/054310, International filing date May 24, 2013; Issued Sep. 16, 2013 (4 pages).
International Search Report for International Application No. PCT/IB2013/054315; International filing date May 24, 2013; Issued Nov. 20, 2013 (7 pages).
International Search Report for International Application No. PCT/IB2013/054324, International Filing date May 24, 2013; Issued Sep. 16, 2013 (4 pages).
International Search Report for International Application No. PCT/IB2013/054325, International Filing date May 24, 2013; Issued Sep. 20, 2013 (5 pages).
International Search Report for International Application No. PCT/US2013/042606, International Filing date May 24, 2013; Issued Sep. 9, 2013 (5 pages).
International Search Report for International Application No. PCT/US2013/042603, International Filing date May 24, 2013; Issued Sep. 11, 2013 (7 pages).
International Search Report for International Application No. PCT/US2013/042729; International Filing Date May 24, 2013; Issued Sep. 10, 2013 (5 pgs).
Written Opinion for International Application No. PCT/US2013/042603; International filing date May 24, 2013; Issued Sep. 11, 2013. (7 pages).
Written Opinion for International Application No. PCT/IB2013/054310; International filing date May 24, 2013; Issued Sep. 16, 2013. (4 pages).
Written Opinion for International Application No. PCT/IB2013/054315; International filing date May 24, 2013; Issued Nov. 20, 2013 (7 pages).
Written Opinion for International Application No. PCT/IB2013/054316; International filing date May 24, 2013; Issued Oct. 4, 2013. (5 pages).
Written Opinion for International Application No. PCT/IB2013/054322; International filling date May 24, 2013; Issued Sep. 20, 2013; (5 pages).
Written Opinion for Intenational Application No. PCT/IB2013/054323; International filling date May 24, 2013; Issued Oct. 17, 2013. (3 pages).
Written Opinion for International Application No. PCT/IB2013/054324; International filing date May 24, 2013; Issued Sep. 19, 2013. (5 pages).
Written Opinion for International Application No. PCT/IB2013/054325; International Filing date May 24, 2013; Issued Sep. 20, 2013; (5 pages).
Written Opinion for International Application No. PCT/US2013/042606; International filing date May 24, 2013; Issued Sep. 9, 2013. (4 pages).
Written Opinion for International Application No. PCT/US2013/042729; International filing date May 24, 2013; Issued Sep. 10, 2013. (6 pages).
International Preliminary Report on Patentablility for International Application No. PCT/IB2013/054306; International Filing Date May 24, 2013; Report Mail Date Dec. 4, 2014 (12 Pages).
International Preliminary Report on Patentability for International Application No. PCT/IB2013/054315; International Filing Date May 24, 2013; Report Mail Date Dec. 4, 2014 (9 Pages).
International Preliminary Report on Patentability for International Application No. PCT/IB2013/054316; International Filing Date May 24, 2013; Report Mail Date Dec. 4, 2014 (6 Pages).
International Preliminary Report on Patentability for International Application No. PCT/IB2013/054322; International Filing Date May 24, 2013; Report Mail Date Dec. 4, 2014 (6 Pages).
International Preliminary Report on Patentability for International Application No. PCT/IB2013/054323; International Filing Date May 24, 2013; Report Mail Date Dec. 4, 2014 (5 Pages).
International Preliminary Report on Patentability for International Application No. PCT/IB2013/054324; International Filing Date May 24, 2013; Report Mail Date Dec. 4, 2014 (7 Pages).
International Preliminary Report on Patentability for International Application No. PCT/IB2013/054325; International Filing Date May 24, 2013; Report Mail Date Dec. 4, 2014 (6 Pages).
International Preliminary Report on Patentability for International Application No. PCT/US2013/042603; International Filing Date May 24, 2013; Report Mail Date Dec. 4, 2014 (9 Pages).
International Preliminary Report on Patentability for International Application No. PCT/US2013/042606; International Filing Date May 24, 2013; Report Mail Date Dec. 4, 2014 (6 Pages).
International Preliminary Report on Patentability for International Application No. PCT/US2013/042729; International Filing Date May 24, 2013; Report Mail Date Dec. 4, 2014 (8 Pages).
Machine Translation of JP 08-081620A. Mar. 26, 1996.

\* cited by examiner

FLAME RETARDANT POLYCARBONATE COMPOSITIONS, METHODS OF MANUFACTURE THEREOF AND ARTICLES COMPRISING THE SAME

CROSS REFERENCE TO RELATED APPLICATIONS

This application claims priority to U.S. Provisional Application No. 61/651,487 filed on May 24, 2012, and to U.S. Provisional Application No. 61/651,481 filed on May 24, 2012, the entire contents of both being hereby incorporated by reference.

BACKGROUND

This disclosure relates to flame retardant polycarbonate compositions, methods of manufacture thereof and to articles comprising the same.

In electronic and electrical devices such as notebook personal computers, e-books, and tablet personal computers, metallic body panels are being replaced by materials that are lighter in weight and offer a robust combination of mechanical properties. These lighter materials result in weight savings, cost savings, and enable the manufacture of complex designs. While these lighter materials can be used to manufacture panels having thinner cross-sectional thicknesses, it is desirable to improve the stiffness of the material to prevent warping. It is also desirable to improve the flame retardancy of the material to reduce fire related hazards.

Electrical components can be provided as molded injection devices (MID) with desired printed conductors. In contrast to older circuit boards made of fiberglass-reinforced plastic or the like, MID components manufactured in this way are three-dimensional (3D) molded parts having an integrated printed conductor layout and possibly further electronic or electromechanical components. The use of MID components of this type, even if the components have only printed conductors and are used to replace conventional wiring inside an electrical or electronic device, saves space, allowing the relevant device to be made smaller. It also lowers the manufacturing costs by reducing the number of assembly and contacting steps. These MID devices have great utility in cell phones, PDAs and notebook applications.

Stamp metal, flexible printed circuit board (FPCB) mounted, and two-shot molding methods are three existing technologies to make an MID. However, stamping and FPCB mounted process have limitations in the pattern geometry, and the tooling is expensive. Also, altering a RF pattern can cause high-priced and time-consuming modifications in tooling. Two-shot-molding (two-component injection molding) processes have also been used to produce 3D-MIDs with real three-dimensional structures. For example, an antenna can be formed by subsequent chemical corrosion, chemical surface activation, and selective metal coating. This method involves relatively high initial costs and is only economically viable for large production numbers. Two-shot-molding is also not regarded as an environmentally friendly process. All of these three methods are tool-based technologies, which have limited flexibility, long development cycles, difficult prototype, expensive design changes, and limited ability to produce miniaturization. Accordingly, it is becoming increasingly popular to form MIDs using a new laser direct structuring (LDS) process. In an LDS process a computer-controlled laser beam travels over the MID to activate the plastic surface at locations where the conductive path is to be situated.

Laser-supported or directed structuring process (LDS) for 3D MIDs simplifies the manufacturing process. For example, the LDS process allows for antenna structures to be directly and cost effectively integrated into the cell phone housing. Further, the LDS process allows for sophisticated mechatronic systems that integrate mechanical and electrical properties for automotive and medical applications. With a laser direct structuring process, it is also possible to obtain small conductive path widths (such as 150 microns or less). In addition, the spacing between the conductive paths can also be small. As a result, MIDs formed from this process can save space and weight in end-use applications. Another advantage of laser direct structuring is its flexibility. If the design of the circuit is to be changed, it is simply a matter of reprogramming the computer that controls the laser.

In summary, LDS process is a promising approach that is getting more and more popular for metalizing only partial areas of three-dimensional plastic surfaces by selective activation followed by selective metal deposition through chemical plating processes. When using special substrate materials, laser irradiation can directly trigger such a selective activation. To further expand the application of this LDS technology, high performance materials are desired with also good flame retardancy as well as LDS functionality for emerging applications which still use traditional MID process, such as, for example, a notebook antenna.

SUMMARY

Disclosed herein is a flame retardant composition comprising 20 to 80 weight percent of a polycarbonate; 1 to 20 weight percent of a laser activatable additive; the laser activatable additive being operative to plate the flame retardant composition upon being activated by a laser; and 1 to 20 weight percent of a phosphazene compound; where all weight percents are based on the total weight of the flame retardant composition.

Disclosed herein too is a method comprising blending 20 to 80 weight percent of a polycarbonate; 1 to 20 weight percent of a laser activatable additive; the laser activatable additive being operative to plate the flame retardant composition upon being activated by a laser; and 1 to 20 weight percent of a phosphazene compound to produce a flame retardant composition; where all weight percents are based on the total weight of the flame retardant composition; and extruding the flame retardant composition.

Disclosed herein too are articles manufactured from the composition.

DETAILED DESCRIPTION

Disclosed herein is a flame retardant composition that displays robust flame retardancy, good plating performance, and good ductility. The flame retardant polycarbonate composition comprises a polycarbonate composition, a laser direct structuring additive and a flame retardant composition that comprises a phosphazene compound. The flame retardant composition displays an advantageous combination of properties that renders it useful in applications which require for both data/signal transfer or identification and good flame retardancy, for example, automotive, healthcare, notebook personal computers, e-books, tablet personal computers, and the like.

Disclosed herein too is a method of manufacturing the flame retardant composition. The method comprises mixing a polycarbonate composition, a laser direct structuring additive, and a flame retardant composition that comprises a phosphazene compound to produce the flame retardant composition.

The term "polycarbonate composition", "polycarbonate" and "polycarbonate resin" mean compositions having repeating structural carbonate units of the formula (1):

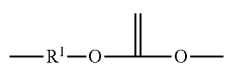
(1)

wherein at least 60 percent of the total number of $R^1$ groups may contain aromatic organic groups and the balance thereof are aliphatic or alicyclic, or aromatic groups. $R^1$ in the carbonate units of formula (1) may be a $C_6$-$C_{36}$ aromatic group wherein at least one moiety is aromatic. Each $R^1$ may be an aromatic organic group, for example, a group of the formula (2):

$$-A^1-Y^1-A^2-\quad (2)$$

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group of $Y^1$ may be a hydrocarbon group or a saturated hydrocarbon group such as methylene, cyclohexylidene, or isopropylidene.

The polycarbonates may be produced from dihydroxy compounds having the formula HO—$R^1$—OH, wherein $R^1$ is defined as above for formula (1). The formula HO—$R^1$—OH includes bisphenol compounds of the formula (3):

$$\text{HO-}A^1\text{-}Y^1\text{-}A^2\text{-OH} \quad (3)$$

wherein $Y^1$, $A^1$, and $A^2$ are as described above. For example, one atom may separate $A^1$ and $A^2$. Each $R^1$ may include bisphenol compounds of the general formula (4):

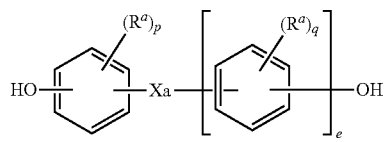
(4)

where $X_a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X_a$ may be single bond, —O—, —S—, —C(O)—, or a $C_{1-18}$ organic group. The $C_{1-18}$ organic bridging group may be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. $R^a$ and $R^b$ may each represent a halogen, $C_{1-12}$ alkyl group, or a combination thereof. For example, $R^a$ and $R^b$ may each be a $C_{1-3}$ alkyl group, specifically methyl, disposed meta to the hydroxy group on each arylene group. The designation (e) is 0 or 1. The numbers p and q are each independently integers of 0 to 4. It will be understood that $R^a$ is hydrogen when p is 0, and likewise $R^b$ is hydrogen when q is 0.

$X_a$ may be substituted or unsubstituted $C_{3-18}$ cycloalkylidene, a $C_{1-25}$ alkylidene of formula —C($R^e$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. This may include methylene, cyclohexylmethylene, ethylidene, neopentylidene, isopropylidene, 2-[2.2.1]-bicycloheptylidene, cyclohexylidene, cyclopentylidene, cyclododecylidene, and adamantylidene. A specific example wherein $X_a$ is a substituted cycloalkylidene is the cyclohexylidene-bridged, alkyl-substituted bisphenol of formula (5):

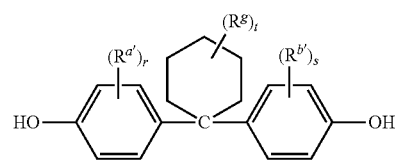
(5)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^g$ may be each independently $C_{1-4}$ alkyl, $R^g$ is $C_{1-4}$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

In an embodiment, $X_a$ is a $C_{1-18}$ alkylene group, a $C_{3-18}$ cycloalkylene group, a fused $C_{6-18}$ cycloalkylene group, or a group of the formula —$B_1$—W—$B_2$— wherein $B_1$ and $B_2$ are the same or different $C_{1-6}$ alkylene group and W is a $C_{3-12}$ cycloalkylidene group or a $C_{6-16}$ arylene group.

In another example, $X_a$ may be a substituted $C_{3-18}$ cycloalkylidene of the formula (6):

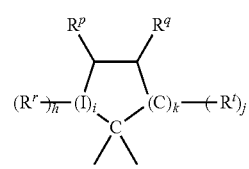
(6)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (5) will have an unsaturated carbon-carbon linkage at the junction where the ring is fused. When i is 0, h is 0, and k is 1, the ring as shown in formula (5) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3-methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as a combination comprising at least one of the foregoing dihydroxy aromatic compounds.

Examples of the types of bisphenol compounds represented by formula (3) may include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PBPP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may exist in the form of the following formula (8):

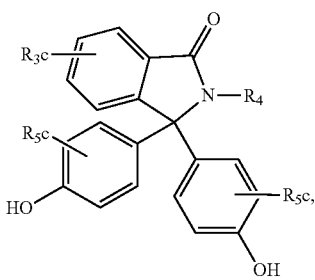

(8)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The dihydroxy compounds of formula (3) may be the following formula (9):

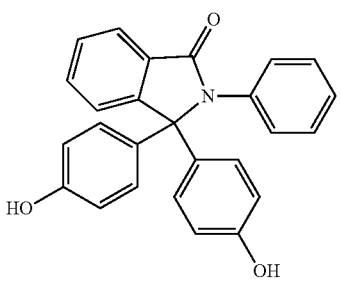

(9)

(also known as 3,3-bis(4-hydroxyphenyl)-2-phenylisoindolin-1-one (PPPBP)).

Alternatively, the dihydroxy compounds of formula (3) may have the following formula (10):

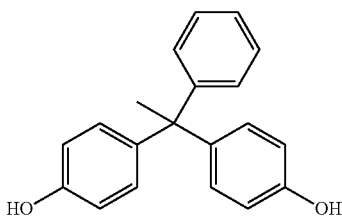

(10)

(also known as 4,4'-(1-phenylethane-1,1-diyl)diphenol (bisphenolAP) or 1,1-bis(4-hydroxyphenyl)-1-phenylethane).

Alternatively, the dihydroxy compounds of formula (3) may have the following formula (11):

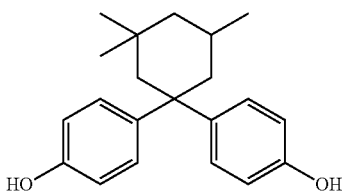

(11)

4,4'-(3,3,5-trimethylcyclohexane-1,1-diyl)diphenol (bisphenol TMC) or 1,1-bis(4-hydroxyphenyl)-3,3,5-trimethylcyclohexane).

Exemplary copolymers containing polycarbonate units may be derived from bisphenol A. In one embodiment, the polycarbonate composition may comprise a polyester-polycarbonate copolymer. A specific type of copolymer may be a polyestercarbonate, also known as a polyester-polycarbonate. As used herein, these terms (i.e., the polyestercarbonate and the polyester-polycarbonate) are synonymous. Such copolymers further contain, in addition to recurring carbonate chain units of the formula (1) as described above, repeating ester units of formula (12):

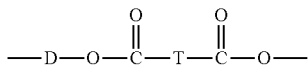

(12)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms. D may be a $C_{2-30}$ alkylene group having a straight chain, branched chain, or cyclic (including polycyclic) structure. O-D-O may be derived from an aromatic dihydroxy compound of formula (3) above. O-D-O may be derived from an aromatic dihydroxy compound of formula (4) above. O-D-O may be derived from an aromatic dihydroxy compound of formula (7) above.

The molar ratio of ester units to carbonate units in the copolymers may vary broadly, for example 1:99 to 99:1, specifically 10:90 to 90:10, and more specifically 25:75 to 75:25, depending on the desired properties of the final composition.

T of formula (12) may be a divalent group derived from a dicarboxylic acid, and may be, for example, a $C_{2-10}$ alkylene group, a $C_{6-20}$ alicyclic group, a $C_{6-20}$ alkyl aromatic group, a $C_{6-20}$ aromatic group, or a $C_6$ to $C_{36}$ divalent organic group derived from a dihydroxy compound or chemical equivalent thereof. In an embodiment, T is an aliphatic group. T may be derived from a $C_6$-$C_{20}$ linear aliphatic alpha-omega ($\alpha\Omega$) dicarboxylic ester.

Diacids from which the T group in the ester unit of formula (12) is derived include aliphatic dicarboxylic acid from 6 to 36 carbon atoms, optionally from 6 to 20 carbon atoms. The $C_6$-$C_{20}$ linear aliphatic alpha-omega ($\alpha\Omega$) dicarboxylic esters may be derived from adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, $C_{14}$, $C_{18}$ and $C_{20}$ diacids.

In an embodiment, aliphatic alpha-omega dicarboxylic acids that may be reacted with a bisphenol to form a polyester include adipic acid, sebacic acid or dodecanedioic acid. Sebacic acid is a dicarboxylic acid having the following formula (13):

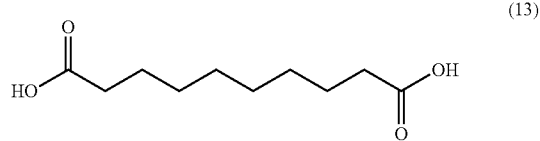 [SMILES: O=C(O)CCCCCCCCC(=O)O]

(13)

Sebacic acid has a molecular mass of 202.25 g/mol, a density of 1.209 g/cm$^3$ (25° C.), and a melting point of 294.4° C. at 100 mm Hg. Sebacic acid may be derived from castor oil.

Other examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, sebacic acid, or combinations thereof.

Mixtures of the diacids can also be employed. It should be noted that although referred to as diacids, any ester precursor could be employed such as acid halides, specifically acid chlorides, and diaromatic esters of the diacid such as diphenyl, for example, the diphenylester of sebacic acid. The diacid carbon atom number does not include any carbon atoms that may be included in the ester precursor portion, for example diphenyl. It may be desirable that at least four, five, or six carbon bonds separate the acid groups. This may reduce the formation of undesirable and unwanted cyclic species. The aromatic dicarboxylic acids may be used in combination with the saturated aliphatic alpha-omega dicarboxylic acids to yield the polyester. In an exemplary embodiment, isophthalic acid or terephthalic acid may be used in combination with the sebacic acid to produce the polyester.

Overall, D of the polyester-polycarbonate may be a $C_{2-9}$ alkylene group and T is p-phenylene, m-phenylene, naphthalene, a divalent cycloaliphatic group, or a combination thereof. This class of polyester includes the poly(alkylene terephthalates).

The polyester-polycarbonate may have a bio-content (i.e., a sebacic acid content) according to ASTM-D-6866 of 2 weight percent (wt %) to 65 wt %, based on the total weight of the polycarbonate composition. In an embodiment, the polyester-polycarbonate may have a bio-content according to ASTM-D-6866 of at least 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 25 wt %, 30 wt %, 35 wt %, 40 wt %, 45 wt %, 50 wt %, 55 wt %, 60 wt % or 65 wt % of the composition derived therefrom. The polyester-polycarbonate may have a bio-content according to ASTM-D-6866 of at least 5 wt % of the polycarbonate composition. In other words, the polycarbonate composition may have at least 5 wt % of sebacic acid.

cally 3 to 10 wt %, specifically 4 to 9 wt %, and more specifically 5 to 8 wt % of the polyester derived from sebacic acid. The polyester-polycarbonate copolymer may comprise 1.0 wt %, 2.0 wt %, 3.0 wt %, 4.0 wt %, 5.0 wt %, 6.0 wt %, 7.0 wt %, 8.0 wt %, 9.0 wt %, 10.0 wt %, 11.0 wt %, 12.0 wt %, 13.0 wt %, 14.0 wt %, and 15.0 wt % of a polyester derived from sebacic acid.

In one form, the first and second polycarbonate copolymers are polyester-polycarbonate copolymers where the polyester is derived by reacting by reacting sebacic acid with bisphenol A and where the polycarbonate is obtained from the reaction of bisphenol A with phosgene. The first and second polycarbonate copolymers containing the polyester-polycarbonate copolymer has the following formula (14):

(14)

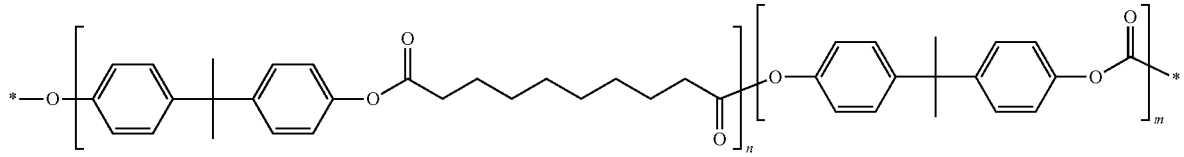

In an embodiment, two polycarbonate copolymers may be used in the flame retardant composition. The first polycarbonate copolymer comprises a polyester derived from sebacic acid that is copolymerized with a polycarbonate. The first polycarbonate polymer is endcapped with phenol or t-butylphenol. The second polycarbonate copolymer also comprises polyester units derived from sebacic acid that is copolymerized with a polycarbonate. The second polycarbonate copolymer is endcapped with para-cumyl phenol (PCP). The first polycarbonate has a lower molecular weight than the second polycarbonate copolymer.

The first polycarbonate copolymer has a weight average molecular weight of 15,000 to 28,000 Daltons, specifically 17,000 to 25,500 Daltons, specifically 19,000 to 23,000 Daltons, and more specifically 20,000 to 22,000 Daltons as measured by gel permeation chromatography using a polycarbonate standard. The first polycarbonate copolymer may comprise 3.0 mole % to 8.0 mole %, specifically 4.0 mole % to 7.5 mole %, and more specifically 5.0 mole % to 6.5 mole % of the polyester derived from sebacic acid.

The first polycarbonate copolymer is used in amounts of 10 to 60 wt %, specifically 15 to 46 wt %, specifically 20 to 43 wt %, and more specifically 23 to 40 wt %, based on the total weight of the flame retardant composition.

In an embodiment, the second polycarbonate copolymer is endcapped with para-cumyl phenol and has a weight average molecular weight of 30,000 to 45,000 Daltons, specifically 32,000 to 40,000 Daltons, specifically 34,000 to 39,000 Daltons, more specifically 35,000 to 38,000 Daltons as measured by gel permeation chromatography using a polycarbonate standard. The second polycarbonate copolymer may comprise 7 mole % to 12 mole %, specifically 7.5 mole % to 10 mole %, and more specifically 8.0 mole % to 9.0 mole % of polyester derived from sebacic acid.

The second polycarbonate copolymer is used in amounts of 10 to 35 wt %, specifically 12 to 32 wt %, specifically 15 to 30 wt %, specifically 18 to 28 wt %, and more specifically 20 to 37 wt %, based on the total weight of the flame retardant composition.

Overall, the first and second polycarbonate copolymers may contain 1 to 15 wt %, specifically 2 to 12 wt %, specifi- Formula (14) may be designed to be a high flow ductile (HFD) polyester-polycarbonate copolymer (HFD). The high flow ductile copolymer has low molecular (LM) weight polyester units derived from sebacic acid. The polyester derived from sebacic acid in the high flow ductile copolymer is present in an amount of 6.0 mole % to 8.5 mole %. In an embodiment, the polyester derived from sebacic acid has a weight average molecular weight of 21, 000 to 36,500 Daltons. In an exemplary embodiment, the high flow ductile polyester-polycarbonate copolymer may have a weight average molecular weight average of 21,500 Daltons as measured by gel permeation chromatography using a polycarbonate standard. It is desirable for the high flow ductile polyester-polycarbonate copolymer to contain 6.0 mole % derived from sebacic acid.

The first and the second polycarbonate copolymer which comprises the polyester-polycarbonate copolymers beneficially have a low level of carboxylic anhydride groups. Anhydride groups are where two aliphatic diacids, or chemical equivalents, react to form an anhydride linkage. The amount of carboxylic acid groups bound in such anhydride linkages should be less than or equal to 10 mole % of the total amount of carboxylic acid content in the copolymer. In other embodiments, the anhydride content should be less than or equal to 5 mole % of carboxylic acid content in the copolymer, and in yet other embodiments, the carboxylic acid content in the copolymer should be less than or equal to 2 mole %.

Low levels of anhydride groups can be achieved by conducting an interfacial polymerization reaction of the dicarboxylic acid, bisphenol and phosgene initially at a low pH (4 to 6) to get a high incorporation of the diacid in the polymer, and then after a proportion of the monomer has been incorporated into the growing polymer chain, switching to a high pH (10 to 11) to convert any anhydride groups into ester linkages. Anhydride linkages can be determined by numerous methods such as, for instance proton NMR analyses showing signal for the hydrogens adjacent to the carbonyl group. In an embodiment, the first and the second polycarbonate copolymer have a low amount of anhydride linkages, such as, for example, less than or equal to 5 mole %, specifically less than or equal to 3 mole %, and more specifically less than or equal to 2 mole %, as determined by proton NMR analysis. Low amounts of anhydride linkages in the polyester-polycarbonate copolymer contributes to superior melt stability in the copolymer, as well as other desirable properties.

Useful polyesters that can be copolymerized with polycarbonate can include aromatic polyesters, poly(alkylene esters) including poly(alkylene arylates), and poly(cycloalkylene diesters). Aromatic polyesters can have a polyester structure according to formula (12), wherein D and T are each aromatic groups as described hereinabove. In an embodiment, useful aromatic polyesters can include, for example, poly(isophthalate-terephthalate-resorcinol)esters, poly(isophthalate-terephthalate-bisphenol A)esters, poly[(isophthalate-terephthalate-resorcinol ester-co-(isophthalate-terephthalate-bisphenol A)]ester, or a combination comprising at least one of these. Also contemplated are aromatic polyesters with a minor amount, e.g., 0.5 to 10 weight percent, based on the total weight of the polyester, of units derived from an aliphatic diacid and/or an aliphatic polyol to make copolyesters. Poly(alkylene arylates) can have a polyester structure according to formula (12), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and polypropylene terephthalate) (PPT). Also useful are poly(alkylene naphthoates), such as poly(ethylene naphthanoate) (PEN), and poly(butylene naphthanoate) (PBN). A specifically useful poly(cycloalkylene diester) is poly(cyclohexanedimethylene terephthalate) (PCT). Combinations comprising at least one of the foregoing polyesters can also be used.

Copolymers comprising alkylene terephthalate repeating ester units with other ester groups can also be useful. Specifically useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (14a)

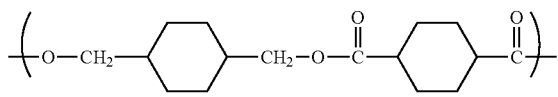

(14a)

wherein, as described using formula (12), D is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polycarbonate and polyester can be used in a weight ratio of 1:99 to 99:1, specifically 10:90 to 90:10, and more specifically 30:70 to 70:30, depending on the function and properties desired.

It is desirable for such a polyester and polycarbonate blend to have an MVR of 5 to 150 cc/10 min., specifically 7 to 125 cc/10 min, more specifically 9 to 110 cc/10 min, and still more specifically 10 to 100 cc/10 min., measured at 300° C. and a load of 1.2 kilograms according to ASTM D1238-04.

Polycarbonates may be manufactured by processes such as interfacial polymerization and melt polymerization. Copolycarbonates having a high glass transition temperature are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors may include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. For example, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine, and aromatic tertiary amines such as N,N-dimethylaniline.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is CL, Br⁻, a $C_{1-8}$ alkoxy group or a $C_{6-18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, specifically, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, specifically $1 \times 10^{-3}$ to $1 \times 10^{-4}$ moles per total mole of the dihydroxy compounds in the reaction mixture.

All types of polycarbonate end groups are contemplated as being useful in the high and low glass transition temperature polycarbonates, provided that such end groups do not significantly adversely affect desired properties of the compositions. An end-capping agent (also referred to as a chain-stopper) can be used to limit molecular weight growth rate, and so control molecular weight of the first and/or second polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as para-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. In an embodiment, at least one of the copolymers is endcapped with para-cumyl phenol (PCP).

Endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In a specific embodiment, where BMSC is used as the activated carbonyl source, the endgroup is derived from and is a residue of BMSC, and is an ester endgroup derived from a salicylic acid ester, having the structure of formula (15):

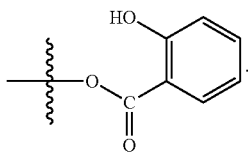

(15)

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by stirring or other forms of agitation. Reactive conditions include time, temperature, pressure and other factors that affect polymerization of the reactants. In an embodiment, the activated aromatic carbonate is added at a mole ratio of 0.8 to 1.3, and more specifically 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028. In another specific embodiment, the activated aromatic carbonate is BMSC.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent and may lead to viscosity problems during phosgenation. Therefore, in some embodiments, an increase in the amount of the chain termination agent is used in the polymerization. The amount of chain termination agent used when the particular branching agent is used is generally higher than if only a chain termination agent alone is used. The amount of chain termination agent used is generally above 5 mole percent and less than 20 mole percent compared to the bisphenol monomer.

In some embodiments, the branching agent is a structure derived from a triacid trichloride of the formula (16)

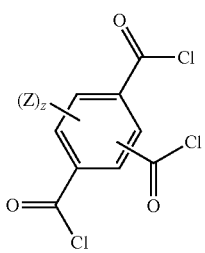

(16)

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (17)

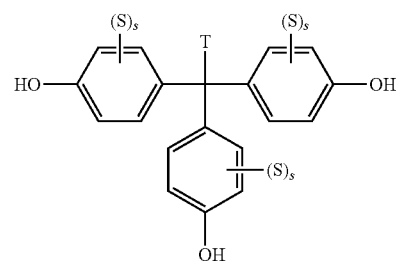

(17)

wherein T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (18)

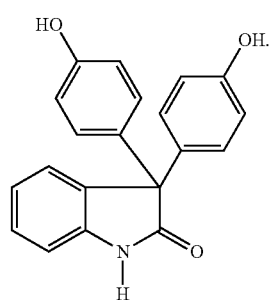

(18)

Examples of specific branching agents that are particularly effective in the compositions include trimellitic trichloride (TMTC), tris-p-hydroxy phenyl ethane (THPE) and isatin-bis-phenol. In an embodiment, in formula (16), z is hydrogen and z is 3. In another embodiment, in formula (17), S is hydrogen, T is methyl, and s is 4.

The relative amount of branching agents used in the manufacture of the polymer will depend on a number of considerations, for example the type of $R^1$ groups, the amount of cyanophenol, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (16), the amount of branching agent tri-ester groups are present in an amount of about 0.1 to 10 branching units per 100 $R^1$ units, specifically about 0.5 to 8 branching units per 100 $R^1$ units, and more specifically about 0.75 to 5 tri-ester units per 100 $R^1$ units. For branching agents having formula (17), the amount of branching agent tricarbonate groups are present in an amount of about 0.1 to 10 branching units per 100 $R^1$ units, specifically about 0.5 to 8 branching units per 100 $R^1$ units, and more specifically about 0.75 to 5 tri-phenylcarbonate units per 100 $R^1$ units. In some embodiments, a combination of two or more branching agents may be used.

In an embodiment, the polycarbonate is a branched polycarbonate comprising units as described above; greater than or equal to 3 mole %, based on the total moles of the polycarbonate, of moieties derived from a branching agent; and end-capping groups derived from an end-capping agent having a pKa between about 8.3 and about 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing.

As noted above, the polycarbonate composition may include a linear polycarbonate, a branched polycarbonate, or a mixture of a linear and a branched polycarbonate. When the polycarbonate composition includes a mixture of a linear and a branched polycarbonate, the branched polycarbonate is used in amounts of 5 to 95 wt %, specifically 10 to 25 wt % and more specifically 12 to 20 wt %, based on the total weight of the polycarbonate composition. Linear polycarbonates are used in amounts of 5 to 95 wt %, specifically 20 to 60 wt %, and more specifically 25 to 55 wt %, based on the total weight of the polycarbonate composition.

The polycarbonate composition is used in amounts of 20 to 80 wt %, specifically 30 to 70 wt %, and more specifically 40 to 60 wt %, based on the total weight of the flame retardant composition.

The polycarbonate composition may further comprise a polysiloxane-polycarbonate copolymer, also referred to as a polysiloxane-polycarbonate. The polydiorganosiloxane (also referred to herein as "polysiloxane") blocks of the copolymer comprise repeating diorganosiloxane units as in formula (19)

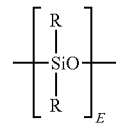

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Combinations of the foregoing R groups can be used in the same copolymer.

The value of E in formula (19) can vary widely depending on the type and relative amount of each component in the flame retardant composition, the desired properties of the composition, and like considerations. Generally, E has an average value of 2 to 1,000, specifically 3 to 500, more specifically 5 to 100. In an embodiment, E has an average value of 10 to 75, and in still another embodiment, E has an average value of 40 to 60. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In an embodiment, the polysiloxane blocks are of formula (20)

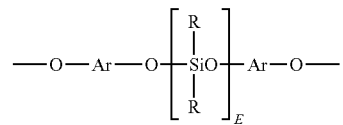

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (20) can be derived from a $C_6$-$C_{30}$ dihydroxyarylene compound, for example a dihydroxyarylene compound of formula (4) or (6) above. Exemplary dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used.

In another embodiment, polysiloxane blocks are of formula (21)

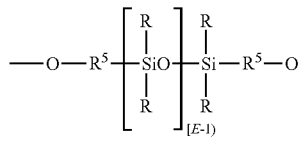
(21)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polysiloxane blocks are of formula (22):

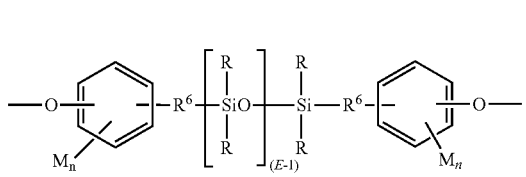
(22)

wherein R and E are as defined above. $R^6$ in formula (22) is a divalent $C_2$-$C_8$ aliphatic group. Each M in formula (22) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^6$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^6$ is a divalent $C_1$-$C_3$ aliphatic group, and R is methyl.

Specific polydiorganosiloxane blocks are of the formula

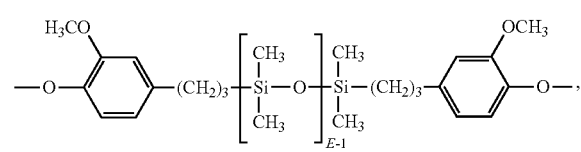
(22a)

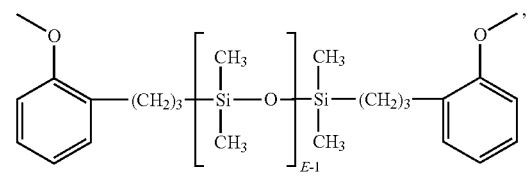
(22b)

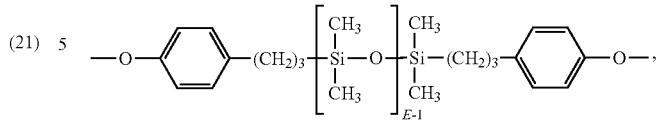
(22c)

or a combination comprising at least one of the foregoing, wherein E has an average value of 2 to 200, 2 to 125, 5 to 125, 5 to 100, 5 to 50, 20 to 80, or 5 to 20.

In an embodiment, locks of formula (19) can be derived from the corresponding dihydroxy polysiloxane (23)

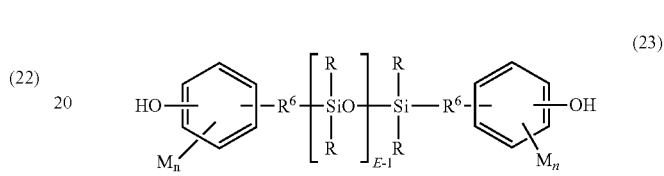
(23)

wherein R, E, M, $R^6$, and n are as described above. Such dihydroxy polysiloxanes can be made by effecting a platinum-catalyzed addition between a siloxane hydride of formula (24)

(24)

wherein R and E are as previously defined, and an aliphatically unsaturated monohydric phenol. Exemplary aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

The polysiloxane-polycarbonate copolymer can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units. In an exemplary embodiment, the polysiloxane-polycarbonate copolymer is endcapped with para-cumyl phenol.

In an embodiment, an exemplary polysiloxane-polycarbonate copolymer is a block copolymer having the structure shown in the Formula (25) below:

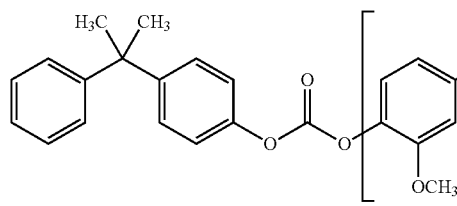
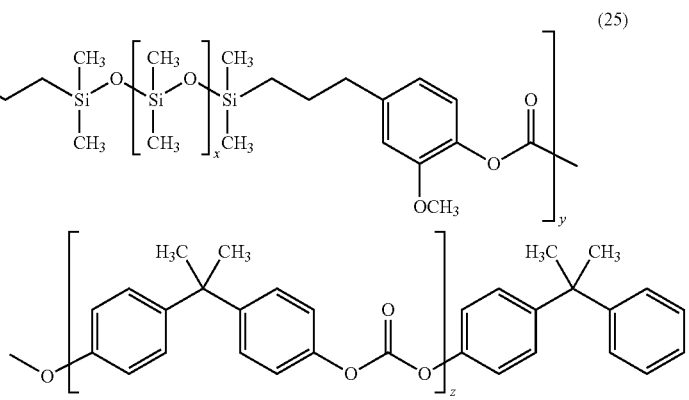

(25)

where the polysiloxane blocks are endcapped with eugenol, where x is 1 to 100, specifically 5 to 85, specifically 10 to 70, specifically 15 to 65, and more specifically 40 to 60. In an embodiment, y is 1 to 90 and z is 1 to 600. The polysiloxane block may be randomly distributed or controlled distributed amongst the polycarbonate blocks. In an embodiment, x is 30 to 50, y is 10 to 30 and z is 450 to 600.

When the polysiloxane polycarbonate copolymer comprises eugenol endcapped polysiloxane, the flame retardant composition comprises 0 to 25 wt % of the polysiloxane-polycarbonate copolymer. The polysiloxane content is 0 to 20 wt %, specifically 1 to 16 wt %, specifically 2 to 14 wt %, and more specifically 3 to 6 wt %, based on the total weight of the polysiloxane-polycarbonate copolymer. In an embodiment, the weight average molecular weight of the polysiloxane block is 29,000 to 30,000 Daltons using gel permeation chromatography with a bisphenol A polycarbonate absolute molecular weight standard.

In an embodiment, the polysiloxane-polycarbonate copolymer comprises 10 wt % or less, specifically 6 wt % or less, and more specifically 4 wt % or less, of the polysiloxane based on the total weight of the polysiloxane-polycarbonate copolymer. Polysiloxane-polycarbonate copolymers containing 10 wt % or less are generally optically transparent and are sometimes referred to as EXL-T as commercially available from SABIC.

In another embodiment, the polysiloxane-polycarbonate copolymer comprises 10 wt % or more, specifically 12 wt % or more, and more specifically 14 wt % or more, of the polysiloxane based on the total weight of the polysiloxane-polycarbonate copolymer. Polysiloxane-polycarbonate copolymers containing 10 wt % or more polysiloxane are generally optically opaque and are sometimes referred to as EXL-P as commercially available from SABIC.

The polysiloxane polycarbonate copolymer can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polysiloxane polycarbonate copolymer can have a melt volume flow rate, measured at 300° C./1.2 kg, of 1 to 50 cubic centimeters per 10 minutes (cc/10 min), specifically 2 to 30 cc/10 min. Mixtures of polysiloxane polycarbonate copolymer of different flow properties can be used to achieve the overall desired flow property.

The polysiloxane polycarbonate copolymer is present in the flame retardant composition in an amount of 3 to 30 wt %, specifically 6 to 20 wt %, and more specifically 7 to 13 wt %, based on the total weight of the flame retardant composition.

The flame retardant composition can optionally include impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric shell grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt %, specifically 3 to 20 wt %, based on the total weight of the polymers in the flame retardant composition. An exemplary impact modifier comprises an acrylic polymer in an amount of 2 to 15 wt %, specifically 3 to 12 wt %, based on the total weight of the flame retardant composition.

The flame retardant composition may also comprise mineral fillers. In an embodiment, the mineral fillers serve as synergists. The synergist facilitates an improvement in the flame retardant properties when added to the flame retardant composition over a comparative polycarbonate composition that contains all of the same ingredients in the same quantities except for the synergist. Examples of mineral fillers are mica, talc, calcium carbonate, dolomite, wollastonite, barium sulfate, silica, kaolin, feldspar, barytes, or the like, or a combination comprising at least one of the foregoing mineral fillers. The mineral filler may have an average particle size of 0.1 to 20 micrometers, specifically 0.5 to 10 micrometers, and more specifically 1 to 3 micrometers. An exemplary mineral filler is talc having an average particle size of 1 to 3 micrometers. The flame retardant composition may also contain glass fibers. The glass fibers are flat fibers.

The mineral filler is present in amounts of 0.1 to 20 wt %, specifically 0.5 to 15 wt %, and more specifically 1 to 5 wt %, based on the total weight of the flame retardant composition.

The flame retardant composition may also optionally contain additives such as antioxidants, antiozonants, stabilizers, thermal stabilizers, mold release agents, dyes, colorants, pigments, flow modifiers, or the like, or a combination comprising at least one of the foregoing additives.

As noted above, the flame retardant composition comprises a flame retarding agent. The flame retarding agent is a phosphazene compound. In an embodiment, the flame retarding agent is a phenoxyphosphazene oligomer.

The phosphazene compound used in the flame retardant composition is an organic compound having a —P=N— bond in the molecule. In an embodiment, the phosphazene compound comprises at least one species of the compound selected from the group consisting of a cyclic phenoxyphosphazene represented by the formula (26) below; a chainlike phenoxyphosphazene represented by the formula (27) below; and a crosslinked phenoxyphosphazene compound obtained by crosslinking at least one species of phenoxyphosphazene selected from those represented by the formulae (26) and (27) below, with a crosslinking group represented by the formula (28) below:

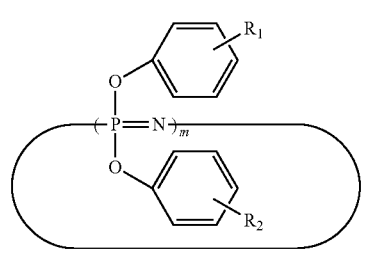

(26)

where in the formula (26), m represents an integer of 3 to 25, $R_1$ and $R_2$ are the same or different and are independently a hydrogen, a hydroxyl, a $C_{7-30}$ aryl group, a $C_{1-12}$ alkoxy, or a $C_{1-12}$ alkyl. A commercially available phenoxyphosphazene having the structure of formula (26) is FP-110® manufactured and distributed by Fushimi Pharmaceutical Co., Ltd.

The chainlike phenoxyphosphazene represented by the formula (27) below:

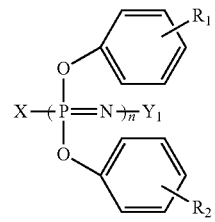

(27)

where in the formula (27), $X^1$ represents a —N=P(OPh)$_3$ group or a —N=P(O)OPh group, $Y^1$ represents a —P(OPh)$_4$ group or a —P(O)(OPh)$_2$ group, n represents an integer from 3 to 10000, Ph represents a phenyl group, $R_1$ and $R_2$ are the same or different and are independently a hydrogen, a hydroxyl, a $C_{1-12}$ alkoxy, or a $C_{1-12}$ alkyl. A commercially available phenoxyphosphazene having the structure of formula (27) is SPB-100® manufactured and distributed by Otsuka Chemical Co., Ltd.

The phenoxyphosphazenes may also have a crosslinking group represented by the formula (28) below:

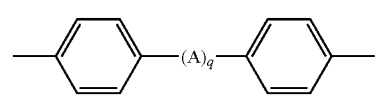

(28)

where in the formula (18), A represents —C(CH3)$_2$—, —SO$_2$—, —S—, or —O—, and q is 0 or 1.

In an embodiment, the phenoxyphosphazene compound has a structure represented by the formula (29)

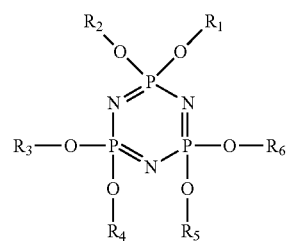

(29)

where $R_1$ to $R_6$ can be the same of different and can be an aryl group, an aralkyl group, a $C_{1-12}$ alkoxy, a $C_{1-12}$ alkyl, or a combination thereof.

In an embodiment, the phenoxyphosphazene compound has a structure represented by the formula (30)

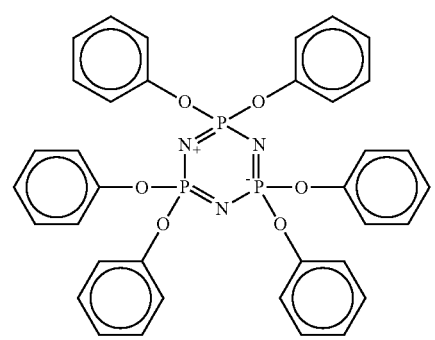

(30)

A commercially available phenoxyphosphazene having the structure of formula (27) is LY202® manufactured and distributed by Lanyin Chemical Co., Ltd.

The cyclic phenoxyphosphazene compound represented by the formula (26) may be exemplified by compounds such as phenoxy cyclotriphosphazene, octaphenoxy cyclotetraphosphazene, and decaphenoxy cyclopentaphosphazene, obtained by allowing ammonium chloride and phosphorus pentachloride to react at 120 to 130° C. to obtain a mixture containing cyclic and straight chain chlorophosphazenes, extracting cyclic chlorophosphazenes such as hexachloro cyclotriphosphazene, octachloro cyclotetraphosphazene, and decachloro cyclopentaphosphazene, and then substituting it with a phenoxy group. The cyclic phenoxyphosphazene compound may be a compound in which m in the formula (26) represents an integer of 3 to 8.

The chainlike phenoxyphosphazene compound represented by the formula (27) is exemplified by a compound obtained by subjecting hexachloro cyclotriphosphazene, obtained by the above-described method, to ring-opening polymerization at 220 to 250° C., and then substituting thus obtained chainlike dichlorophosphazene having a degree of polymerization of 3 to 10000 with phenoxy groups. The chain-like phenoxyphosphazene compound has a value of n in the formula (27) of 3 to 1000, specifically 5 to 100, and more specifically 6 to 25.

The crosslinked phenoxyphosphazene compound may be exemplified by compounds having a crosslinked structure of a 4,4'-diphenylene group, such as a compound having a crosslinked structure of a 4,4'-sulfonyldiphenylene (bisphenol S residue), a compound having a crosslinked structure of a 2,2-(4,4'-diphenylene)isopropylidene group, a compound having a crosslinked structure of a 4,4'-oxydiphenylene group, and a compound having a crosslinked structure of a 4,4'-thiodiphenylene group. The phenylene group content of the crosslinked phenoxyphosphazene compound is generally 50 to 99.9 wt %, and specifically 70 to 90 wt %, based on the total number of phenyl group and phenylene group contained in the cyclic phosphazene compound represented by the formula (26) and/or the chainlike phenoxyphosphazene compound represented by the formula (27). The crosslinked phenoxyphosphazene compound may be particularly preferable if it doesn't have any free hydroxyl groups in the molecule thereof. In an exemplary embodiment, the phosphazene compound comprises the cyclic phosphazene.

It is desirable for the flame retardant composition to comprise the phosphazene compound in an amount of 1 to 20 wt %, specifically 2 to 16 wt %, and more specifically 2.5 wt % to 14 wt %, based on the total weight of the flame retardant composition.

The acid may be present in amounts of about 0.00001 to about 1.0 wt %, specifically about 0.0001 to about 0.1 wt %, based on the total weight of the flame retardant polycarbonate composition.

The flame retardant composition includes a laser direct structuring (LDS) additive. The LDS additive is selected to enable the composition to be used in a laser direct structuring process. In an LDS process, a laser beam exposes the LDS additive to place it at the surface of the thermoplastic composition and to activate metal atoms from the LDS additive. As such, the LDS additive is selected such that, upon exposed to a laser beam, metal atoms are activated and exposed while in areas not exposed by the laser beam, no metal atoms are exposed. In addition, the LDS additive is selected such that, after being exposed to laser beam, the etching area is capable of being plated to form conductive structure. As used herein "capable of being plated" refers to a material wherein a substantially uniform metal plating layer can be plated on laser-etched area and show a wide window for laser parameters.

In addition to enabling the flame retardant composition to be used in a laser direct structuring (LDS) process, the LDS additive is also selected to help increase the dielectric constant and lower the loss tangent by acting as a synergist with the ceramic filler. In general, high Dk, low Df compounds using ceramic fillers alone cannot be used to produce an antenna by using LDS technology. However, it has been found that the addition of an LDS additive, such as copper chromium oxide spinel, when added together with ceramic fillers, enables the formation of metal seeds by the LDS process. Electrical conductor track structures can be arranged on these high Dk low Df materials by subsequent plating after activation by the laser during the LDS process. For example, breaking down copper chromium oxide spinel forms heavy-metal nuclei during activation with the laser during the LDS process. These nuclei enable the material to then be plated by enabling adhesion of the metallization layer in metallization process. As such, the resulting materials have a low dielectric loss tangent. In an embodiment, the material has a dielectric loss tangent of 0.01 or less.

In addition, it has been found that the LDS additive provides a synergistic effect on the dielectric constant of the material. If no LDS additive is used, then, with ceramic fillers alone, in order to get certain level of dielectric constant, a high ceramic filler loading is desirable. As a result, the specific gravity of the materials is higher. However, by adding the LDS additive, it is possible to achieve the same level of dielectric constant using a small amount of LDS additive with a reduced ceramic filler loading. As a result, lower total filler loadings can be achieved as well as a lower specific gravity. As such, the weight of molded parts will be reduced, resulting in lighter, less expensive products.

Examples of LDS additives are a heavy metal mixture oxide spinel, such as copper chromium oxide spinel; a copper salt, such as copper hydroxide phosphate copper phosphate, copper sulfate, cuprous thiocyanate, spinel based metal oxides (such as copper chromium oxide), organic metal complexes (such as palladium/palladium-containing heavy metal complexes), metal oxides, metal oxide-coated fillers, antimony doped tin oxide coated on a mica substrate, a copper containing metal oxide, a zinc containing metal oxide, a tin containing metal oxide, a magnesium containing metal oxide, an aluminum containing metal oxide, a gold containing metal oxide, a silver containing metal oxide, or the like, or a combination comprising at least one of the foregoing LDS additives.

In an embodiment, the LDS additive is a heavy metal mixture oxide spinel, such as copper chromium oxide. The use of the heavy metal mixture oxide spinel enables the composition to be used in a laser direct structuring process while also enhancing the dielectric constant characteristics of the composition such that lower amounts of the ceramic filler are used, thereby improving the reducing the specific gravity of the material and providing a material having a low loss tangent.

In an embodiment, the LDS additive is present in amounts of about 0.1 to about 30 wt %, specifically about 0.2 to about 15 wt %, and more specifically about 1 to about 10 wt %, based on the total weight of the flame retardant composition.

As discussed, the LDS additive is selected such that, after activating with a laser, the conductive path can be formed by followed a standard electroless plating process. When the LDS additive is exposed to the laser, elemental metal is released. The laser draws the circuit pattern onto the part and leaves behind a roughened surface containing embedded metal particles. These particles act as nuclei for the crystal growth during a subsequent plating process, such as a copper plating process. Other electroless plating processes that may be used include, but are not limited to, gold plating, nickel plating, silver plating, zinc plating, tin plating, or the like.

In an embodiment, the flame retardant composition may comprise pigments. Examples of suitable pigments are titanium dioxide ($TiO_2$), zinc sulfide (ZnS), carbon black, carbon nanotubes, silica, alumina, zinc oxide, titanium dioxides, $BaSO_4$, $CaCO_3$, $BaTiO_3$, iron oxides, zinc sulfide, aluminates; sodium sulfo-silicates; sulfates and chromates; zinc ferrites; ultramarine blue; Pigment Brown 24; Pigment Red 101; Pigment Yellow 119; Pigment black 28; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, coumarin 460 (blue), coumarin 6 (green), nile red, lanthanide complexes, hydrocarbon and substituted hydrocarbon dyes, polycyclic aromatic hydrocarbons, scintillation dyes (e.g., oxazoles and oxadiazoles), aryl- or heteroaryl-substituted poly (2-8 olefins), carbocyanine dyes, phthalocyanine dyes and pigments, oxazine dyes, carbostyryl dyes, porphyrin dyes, acridine dyes, anthraquinone dyes, arylmethane dyes, azo dyes, diazonium dyes, nitro dyes, quinone imine dyes, tetrazolium dyes, thiazole dyes, perylene dyes, perinone dyes, bis-benzoxazolylthiophene (BBOT), and xanthene dyes, fluorophores such as anti-stokes shift dyes which absorb in the near infrared wavelength and emit in the visible wavelength, or the like, luminescent dyes such as 5-amino-9-diethyliminobenzo(a)phenoxazonium perchlorate, 7-amino-4-methylcarbostyryl, 7-amino-4-methylcoumarin, 3-(2'-benzimidazolyl)-7-N,N-diethylaminocoumarin, 3-(2'-benzothiazolyl)-7-diethylaminocoumarin, 2-(4-biphenylyl)-5-(4-t-butylphenyl)-1,3,4-oxadiazole, 2-(4-biphenyl)-6-phenylbenzoxazole-1,3,2,5-Bis-(4-biphenylyl)-1,3,4-oxadiazole, 2,5-bis-(4-biphenylyl)-oxazole, 4,4'-bis-(2-butyloctyloxy)-p-quaterphenyl, p-bis(o-methylstyryl)-benzene, 5,9-diaminobenzo(a)phenoxazonium perchlorate, 4-dicyanomethylene-2-methyl-6-(p-dimethylamino styryl)-4H-pyran, 1,1'-diethyl-2,2'-carbocyanine iodide, 3,3'-diethyl-4,4',5,5'-dibenzothiatricarbocyanine iodide, 7-diethylamino-4-methylcoumarin, 7-diethylamino-4-trifluoromethylcoumarin, 2,2'-dimethyl-p-quaterphenyl, 2,2-dimethyl-p-terphenyl, 7-ethylamino-6-methyl-4-trifluoromethylcoumarin, 7-ethylamino-4-trifluoromethylcoumarin, nile red, rhodamine 700, oxazine 750, rhodamine 800, IR 125, IR 144, IR 140, IR 132, IR 26, IRS, diphenylhexatriene, diphenylbutadiene, tetraphenylbutadiene, naphthalene, anthracene, 9,10-diphenylanthracene, pyrene, chrysene, rubrene, coronene, phenanthrene or the like, or a combination comprising at least one of the foregoing pigments. An exemplary flame retardant composition may contain titanium dioxide and carbon black as pigments. The flame retardant composition comprise 1 to 15 wt % of a pigment, specifically 2 to 12 wt % of a pigment, based on the total weight of the flame retardant composition The flame retardant composition may also contain pentaerythritol tetrastearate in amounts of 0.01 to 2.0 wt %, based on the total weight of the flame retardant composition.

In an embodiment, the flame retardant composition may comprise an anti-drip agent. Fluorinated polyolefin and/or polytetrafluoroethylene may be used as an anti-drip agent.

Anti-drip agents may also be used, for example a fibril forming or non-fibril forming fluoropolymer such as polytetrafluoroethylene (PTFE). The anti-drip agent may be encapsulated by a rigid copolymer such as, for example styrene acrylonitrile (SAN). PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

The anti-drip agent may be added in the form of relatively large particles having a number average particle size of 0.3 to 0.7 mm, specifically 0.4 to 0.6 millimeters. The anti-drip agent may be used in amounts of 0.01 wt % to 5.0 wt %, specifically 0.1 to 1.0 wt %, and more specifically 0.2 to 0.8 wt %, based on the total weight of the flame retardant composition.

Other additives such as anti-oxidants, anti-ozonants, mold release agents, thermal stabilizers, levelers, viscosity modifying agents, free-radical quenching agents, other polymers or copolymers such as impact modifiers, or the like.

The preparation of the flame retardant composition can be achieved by blending the ingredients under conditions that produce an intimate blend. All of the ingredients can be added initially to the processing system, or else certain additives can be precompounded with one or more of the primary components.

In an embodiment, the flame retardant composition is manufactured by blending the polycarbonate composition with the phosphazene compound and the laser direct structuring additive. The blending can be dry blending, melt blending, solution blending, or a combination comprising at least one of the foregoing forms of blending.

In an embodiment, the flame retardant composition can be dry blended to form a mixture in a device such as a Henschel mixer or a Waring blender prior to being fed to an extruder, where the mixture is melt blended. In another embodiment, a portion of the polycarbonate composition can be premixed with the phosphazene compound to form a dry preblend. The dry preblend is then melt blended with the remainder of the polycarbonate composition in an extruder. In an embodiment, some of the flame retardant composition can be fed initially at the mouth of the extruder while the remaining portion of the flame retardant composition is fed through a port downstream of the mouth.

Blending of the flame retardant composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

The flame retardant composition can be introduced into the melt blending device in the form of a masterbatch. For example, a portion of the polycarbonate composition can be pre-blended with the phosphazene flame retardant to form a masterbatch, which is then blended with the remaining ingredients to form the flame retardant composition. In such a process, the masterbatch may be introduced into the blending device downstream of the point where the remaining ingredients of the flame retardant composition are introduced.

In an embodiment, the flame retardant composition disclosed herein is used to prepare molded articles such as for example, durable articles, electrical and electronic components, automotive parts, and the like. The compositions can be converted to articles using common thermoplastic processes such as film and sheet extrusion, injection molding, gas-assisted injection molding, extrusion molding, compression molding and blow molding.

In an embodiment, the flame retardant compositions when prepared into test specimens having a thickness of at least 1.2 mm, exhibit a flammability class rating according to Underwriters Laboratories Inc. UL-94 of at least V-2, more specifically at least V-1, and yet more specifically at least V-0. In another embodiment, the flame retardant compositions when prepared into specimens having a thickness of at least 2.0 millimeters, exhibit a flammability class rating according to Underwriters Laboratories Inc. UL-94 of at least V-2, more specifically at least V-1, and yet more specifically at least V-0.

Flammability tests were performed following the procedure of Underwriter's Laboratory Bulletin 94 entitled "Tests for Flammability of Plastic Materials, UL 94". Several ratings can be applied based on the rate of burning, time to extinguish, ability to resist dripping, and whether or not drips are burning. Samples for testing are bars having dimensions of 125 mm length×13 mm width by no greater than 13 mm thickness. Bar thicknesses were 0.6 mm or 0.8 mm. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

In an embodiment, the flame retardant compositions are of particular utility in the manufacture flame retardant articles that pass the UL94 vertical burn tests, in particular the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad. Various embodiments of the compositions described herein meet the UL94 5VB standard.

Izod Impact Strength is used to compare the impact resistances of plastic materials. Notched Izod impact strength was determined at both 23° C. and 0° C. using a 3.2-mm thick, molded, notched Izod impact bar. It was determined per ASTM D256. The results are reported in Joules per meter. Tests were conducted at room temperature (23° C.) and at a low temperature (−20° C.).

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT was determined as flatwise under 1.82 MPa loading with 3.2 mm thickness bar according to ASTM D648. Results are reported in ° C.

The flame retardant composition displays an advantageous combination of properties such as ductility, melt proccessability, impact strength and flame retardancy.

The following examples, which are meant to be exemplary, not limiting, illustrate the flame retardant compositions and methods of manufacturing of some of the various embodiments of the flame retardant compositions described herein.

EXAMPLES

Example 1

This example along with Example 2 was conducted to demonstrate the disclosed composition and the method of manufacturing a flame retardant composition that comprises the polycarbonate composition, a phosphazene flame retardant and a laser direct structuring additive. The polycarbonate is blend of high flow polycarboante(PC2), low flow polycarboante (PC1) and the 20 wt % polysiloxane-polycarbonate copolymer resins (PC3) with an MVR at 300° C./1.2 kg, of 13.0-14.0 g/10 min. The polycarbonate resins used in this example are shown below in the Tables 1a and 1b. The molecular weight specified is a weight average molecular weight as determined using a polycarbonate standard.

TABLE 1a

| Resin I.D. | M_w target (g/mole) | MVR (300° C., 1.2 kg) | Comments |
|---|---|---|---|
| PC2 | 29900 | 5.1-6.9 | Lexan Bisphenol A polycarbonate, ranging in molecular weight from 18,000 to 40,000 on an absolute PC molecular weight scale. |
| PC1 | 21900 | 23.5-28.5 | |
| PC3 | 28500-30000 | 7 | A BPA polycarbonate-polysiloxane copolymer comprising 20% by weight of siloxane, 80% by weight BPA, endcapped with para-cumyl phenol. |

Table 1b lists ingredients used in the following examples (Example 1 and Example 2) along with a brief description of these ingredients. Table 2 lists the compounding conditions in the extruder, while Table 3 lists the compounding conditions in the molding machine. Table 4 lists comparative compositions along with compositions of the disclosure.

TABLE 1b

| Ingredient | Description |
|---|---|
| PC1 | Bisphenol A polycarbonate (linear) endcapped with para-cumyl phenol with Mw target = 21900 and MVR at 300° C./1.2 kg, of about 23.5 to about 28.5 g/10 min. |
| PC2 | Bisphenol A polycarbonate (linear) endcapped with para-cumyl phenol with Mw target = 29900 and MVR at 300° C./1.2 kg, of about 5.1 to 6.9 g/10 min |
| PC3 | Bisphenol A polycarbonate-polysiloxane copolymer comprising about 20% by weight of siloxane, 80% by weight BPA and endcapped with para-cumyl phenol with Mw target = 28500-30000 grams per mole and MVR at 300° C./12 kg of about 7 g/10 min |
| LDS additive | Copper Chromite Black Spinel with Shepherd product no. Black 1 G |
| TSAN | SAN encapsulated PTFE - intermediate resin |
| Talc | Fine Talc with Luzenac product no. Jetfine 3 C A |
| Phenoxyphosphazene | Phenoxyphosphazene with FUSHIMI product no. Rabitle ® FP-110 |
| BPADP | Bisphenol A bis(diphenyl phosphate) with Nagase product no. CR741 |
| KSS | Potassium diphenyl sulfone |
| PETS | Pentaerythritol tetrastearate |
| Antioxidant 1 | Mono zinc phosphate with Budenheim product no. Z21-82 |
| Antioxidant 2 | Hindered Phenol Antioxidant with Ciba product no. Irganox 1076 |
| Antioxidant 3 | Tris(2,4-di-tert-butylphenyl) phosphite with Ciba product no. IRGAFOS 168 |
| Antioxidant 4 | 2-(2'hydroxy-5-T-octylphenyl)-benzotriazole with Ciba product no. Tinuvin 329 |
| Metal deactivator | 2,2'-oxalyldiamidobis[ethyl 3-(3,5-di-tert-butyl-4-hydroxyphenyl)propionate] with Chemtura product no. Naugard XL-1 |
| Chain Extender | Modified acrylic copolymer with BASF product no. Joncryl* ADR 4368 |

The compounding was conducted on a Toshiba SE37 mm twin-screw extruder having 11 barrels. The temperature for each of the barrels is detailed in the Table 2. All the components were fed from main throat from upper stream. The LDS additives and the phenoxyphosphazene were pre-blended with the polycarbonate powder in a super blender and then fed into the extruder. The various compositions along with the properties are detailed in the Table 4. The test standards used for the property measurements are detailed in the respective property tables.

TABLE 2

| Parameters | Unit of Measure | Settings |
|---|---|---|
| Compounder Type | NONE | Toshiba TEM-37BS |
| Barrel Size | mm | 1500 |
| Die | mm | 4 |
| Zone 1 Temp | ° C. | 50 |
| Zone 2 Temp | ° C. | 100 |
| Zone 3 Temp | ° C. | 200 |
| Zone 4 Temp | ° C. | 250 |
| Zone 5 Temp | ° C. | 260 |
| Zone 6 Temp | ° C. | 260 |
| Zone 7 Temp | ° C. | 260 |
| Zone 8 Temp | ° C. | 260 |
| Zone 9 Temp | ° C. | 260 |
| Zone 10 Temp | ° C. | 260 |
| Zone 11 Temp | ° C. | 260 |
| Die Temp | ° C. | 265 |
| Screw speed | rpm | 300 |
| Throughput | kg/hr | 40 |
| Vacuum | MPa | −0.08 |
| Side Feeder speed | rpm | 300 |
| Side feeder 1 | | barrel 7 |

The molding conditions are detailed in the Table 3 below.

TABLE 3

| Parameter | Unit of Measure | Settings |
|---|---|---|
| Pre-drying time | Hour | 4 |
| Pre-drying temp | ° C. | 100 |
| Hopper temp | ° C. | 50 |
| Zone 1 temp | ° C. | 280 |
| Zone 2 temp | ° C. | 300 |
| Zone 3 temp | ° C. | 300 |
| Nozzle temp | ° C. | 290 |

TABLE 3-continued

| Parameter | Unit of Measure | Settings |
|---|---|---|
| Mold temp | °C. | 80-100 |
| Screw speed | rpm | 60-100 |
| Back pressure | kgf/cm$^2$ | 30-50 |
| Cooling time | s | 20 |
| Molding Machine | NONE | FANUC |
| Shot volume | mm | 84 |
| Injection speed (mm/s) | mm/s | 60 |
| Holding pressure | kgf/cm$^2$ | 800 |
| Max. Injection pressure | kgf/cm$^2$ | 1000 |

The compositions were all compounded from twin-screw extruder, and the pellets were collected for evaluation and molding. The ASTM standard molded parts were evaluated accordingly to the standards for flexural, tensile, notched Izod and multi axis impact.

Table 4 below details some comparative flame retardant compositions along with the mechanical and flame retardant properties. The polycarbonate is a blend of the high flow (PC1), the low flow (PC2) and the 20 wt % polysiloxane-polycarbonate copolymer (PC3) as detailed in the Table 1a above. The term "Others" as listed in the Table 4 comprises ingredients that are listed in the Table 5. It also details the properties of the flame retardant compositions disclosed herein. Sample #s 1 and 2 in the Table 4 are comparative samples that contain the comparative flame retardants KSS and BPADP respectively. Sample #s 3, 4 and 5 contain the phenoxyphosphazene. All of the samples contain 10 wt % of the LDS additive. The LDS additive is copper chromite black spinel.

The density was determined as per ISO 1183. Notched Izod tests were conducted as per ASTM D 256. Tensile testing was conducted at a rate of 5 millimeters per minute as per ASTM D638. Flexural testing was conducted at a rate of 1.27 millimeters per minute as per ASTM D790. The heat distortion temperature was measured at 1.82 MPa on bars having a thickness of 3.2 millimeters as per ASTM D 648. The probability of a first time pass p(FTP) was determined for a flame retardancy of V-0 as per UL-94 protocols on bars having a thickness of 0.75 millimeters to 1.5 millimeters as can be seen in the Table 4 below.

TABLE 4

| Formulation | Units | Sample #1* | Sample #2* | Sample #3 | Sample #4 | Sample #5 |
|---|---|---|---|---|---|---|
| PC | % | 85.3 | 82.6 | 84.6 | 83.6 | 82.6 |
| LDS additives | % | 10 | 10 | 10 | 10 | 10 |
| BPADP | % |  | 3 |  |  |  |
| KSS | % | 0.3 |  |  |  |  |
| Phenoxyphosphazene | % |  |  | 1 | 2 | 3 |
| Others** | % | 4.4 | 4.4 | 4.4 | 4.4 | 4.4 |
| Density | g/cm$^3$ | 1.3038 | 1.2984 | 1.3089 | 1.3105 | 1.3134 |
| Notched Impact Strength, 23 C | J/m | 639 | 579 | 919 | 1010 | 1170 |
| Notched Impact Strength, −20° C. | J/m | 191 | 142 | 837 | 951 | 909 |
| HDT, 1.82 MPa, 3.2 mm | °C. | 122 | 111 | 121 | 121 | 117 |
| Flexural Modulus | MPa | 2430 | 2400 | 2370 | 2430 | 2460 |
| Flexural Stress@Yield | MPa | 86 | 92 | 88 | 88 | 88 |
| Modulus of Elasticity | MPa | 2588 | 2608 | 2599 | 2632 | 2667 |
| Stress at Yield | MPa | 54 | 59 | 56 | 57 | 57 |
| Elongation at Break | % | 47 | 18 | 53 | 50 | 56 |
| V-0@0.75 mm, 23° C., 48 hr P(FTP) |  | Did not pass |  | 0.12 | 0.04 | 0.77 |
| 5-bars FOT*** |  |  |  | 26.3 | 30.6 | 2.8 |
| UL-94 results/comments |  |  |  |  | no dripping | no dripping |
| V-0@0.75 mm, 70° C., 168 hr P(FTP) |  |  |  | 0.06 | 0.25 | 0.90 |
| 5-bars FOT |  |  |  | 9.9 | 8.0 | 2.7 |
| UL-94 results/comments |  |  |  | no dripping | no dripping | no dripping |
| V-0@1.0 mm, 23° C., 48 hr P(FTP) |  |  |  | 0.90 | 1.00 | 1.00 |
| 5-bars FOT |  |  |  | 14.5 | 9.9 | 8.2 |
| UL-94 results/comments |  |  |  | no dripping | no dripping | no dripping |
| V-0@1.0 mm, 70° C., 168 hr P(FTP) |  |  |  | 0.90 | 0.99 | 1.00 |
| 5-bars FOT |  |  |  | 14.0 | 11.2 | 8.4 |
| UL-94 results/comments |  |  |  | no dripping | no dripping | no dripping |
| V-0@1.2 mm, 23° C., 48 hr P(FTP) |  |  |  | 1.00 | 0.97 | 0.99 |
| 5-bars FOT |  |  |  | 10.0 | 9.6 | 8.6 |
| UL-94 results/comments |  |  |  | no dripping | no dripping | no dripping |
| V-0@1.2 mm, 70° C., 168 hr PFTP |  |  |  | 1.00 | 1.00 | 1.00 |
| 5-bars FOT |  |  |  | 9.4 | 7.5 | 7.6 |
| UL-94 results/comments |  |  |  | no dripping | no dripping | no dripping |
| V-0@1.5 mm, 23° C., 48 hr P(FTP) |  | 0.92 | 0.92 | 0.92 | 1.00 | 1.00 |
| 5-bars FOT |  | 12.1 | 9.9 | 91 | 5.6 | 6.0 |

TABLE 4-continued

| Formulation | Units | Sample #1* | Sample #2* | Sample #3 | Sample #4 | Sample #5 |
|---|---|---|---|---|---|---|
| UL-94 results/comments | | no dripping | no dripping | no dripping | no dripping | no dripping |
| V-0@1.55 mm, 70° C., 168 hr | P(FTP) | 0.84 | 0.90 | 1.00 | 1.00 | 1.00 |
| | 5-bars FOT | 14.0 | 11.7 | 7.3 | 6.7 | 6.3 |
| UL-94 results/comments | | no dripping | no dripping | no dripping | no dripping | no dripping |

*comparative samples
**listed in the Table 5
***Flame out test

TABLE 5

| Phosphite stabilizer | wt % | 0.06 | 0.06 | 0.06 | 0.06 |
|---|---|---|---|---|---|
| Hindered phenol stabilizer | wt % | 0.1 | 0.1 | 0.1 | 0.1 |
| Metal deactivator | wt % | 0.1 | 0.1 | 0.1 | 0.1 |
| SAN encapsulated PTFE - intermediate resin | wt % | 0.5 | 0.5 | 0.5 | 0.5 |
| 2-(2'-Hydroxy-5-T-octylphenyl)-benzotriazole | wt % | 0.12 | 0.12 | 0.12 | 0.12 |
| Pentaerythritol tetrastearate | wt % | 0.05 | 0.05 | 0.05 | 0.05 |
| Mono Zinc Phosphate (MZP) | wt % | 0.2 | 0.2 | 0.2 | 0.2 |
| ADR 4368 (cesa 9900) | wt % | 0.2 | 0.2 | 0.2 | 0.2 |
| Fine Talc | wt % | 3 | 3 | 3 | 3 |

Table 4 shows that the comparative samples do not pass the flame retardancy tests conducted as per the UL-94 protocol. The samples of the disclosed flame retardant composition on the other hand show excellent flame retardancy at thicknesses of 1.00 millimeter or greater. Even at thicknesses of 0.75 millimeters, the disclosed compositions show no dripping when 3 wt % of the phenoxyphosphazene compound is added to the flame retardant composition.

The probability of a first time pass of attaining V-0 as per UL-94 protocols is greater than or equal to 90% for samples comprising the disclosed flame retardant composition having a thickness of 0.75 millimeter or greater. In an embodiment, the probability of a first time pass of attaining V-0 as per UL-94 protocols is greater than or equal to 92%, specifically greater than or equal to 94%, specifically greater than or equal to 96%, and more specifically greater than or equal to 99%, for samples comprising the disclosed flame retardant composition having a thickness of 1.0 millimeter or less.

The samples of the disclosed flame retardant composition also show an impact strength of greater than or equal to 900 joules per meter, specifically greater than or equal to 1000 joules per meter, and more specifically greater than or equal to 1050 joules per meter, when tested as per ASTM D 256 at 23° C. In an embodiment, the samples of the disclosed flame retardant composition also show an impact strength of greater than or equal to 800 joules per meter, specifically greater than or equal to 900 joules per meter, and more specifically greater than or equal to 950 joules per meter, when tested as per ASTM D 256 at low temperatures of −23° C.

The samples also show a low flame out time (FOT) 8.6 seconds, specifically less than 7 seconds, and more specifically less than 6 seconds at thickness of 0.75 millimeters to 1.5 millimeters when tested as per UL-94 protocol.

In summary, these examples (from the Table 4) demonstrate that: a) phosphazene is effective as flame retardant additive for a polycarbonate composition containing an LDS additive; b) phosphazene is more effective than BPADP; c) to achieve the same or even better flame retardancy, less flame retardant additive is needed when using phosphazene than when using others flame retardants such as BPADP; c) ductility and impact strength are still preserved when phosphazene is used as a flame retardant, while with BPADP these properties are not maintained. D) the use of phosphazene facilitates the retention of a higher heat distortion temperature while achieving an identical level of flame retardancy.

Example 2

This example was also conducted to demonstrate the disclosed composition and the method of manufacturing a flame retardant composition that comprises the polycarbonate composition, a phosphazene flame retardant and a laser direct structuring additive. The samples were also compounded, extruded, and molded according to the details provided in the Table 2 and 3 above. The compositions are provided in the Table 6 while the properties are provided in the Table 7. Sample #s 6-9 contain increasing amounts of the phenoxyphosphazene flame retardants respectively.

TABLE 6

| Item Description | Unit | Sample #6 | Sample #7 | Sample #8 | Sample #9 |
|---|---|---|---|---|---|
| 100 GRADE PCP | wt % | 68.67 | 67.67 | 66.67 | 65.67 |
| PCP 1300 | wt % | 10 | 10 | 10 | 10 |
| 20% PC/SILOXANE copolymer, PCP endcapped | wt % | 10 | 10 | 10 | 10 |
| Phosphite stabilizer | wt % | 0.06 | 0.06 | 0.06 | 0.06 |
| Hindered phenol stabilizer | wt % | 0.1 | 0.1 | 0.1 | 0.1 |
| Metal deactivator | wt % | 0.1 | 0.1 | 0.1 | 0.1 |
| SAN encapsulated PTFE- intermediate resin | wt % | 0.5 | 0.5 | 0.5 | 0.5 |
| 2-(2'HYDROXY-5-T-OCTYLPHENYL)-BENZOTRIAZOLE | wt % | 0.12 | 0.12 | 0.12 | 0.12 |
| Pentaerythritol tetrastearate | wt % | 0.05 | 0.05 | 0.05 | 0.05 |
| Phenoxyphosphazene | wt % | 1 | 2 | 3 | 4 |
| Mono Zinc Phosphate (MZP) | wt % | 0.2 | 0.2 | 0.2 | 0.2 |
| ADR 4368 (cesa 9900) | wt % | 0.2 | 0.2 | 0.2 | 0.2 |
| Shepherd Black 1G (LDS | wt % | 6 | 6 | 6 | 6 |

TABLE 6-continued

| additive)<br>Fine Talc | wt % | | 3 | 3 | 3 | 3 |
|---|---|---|---|---|---|---|
| Typical Properties | Test Method | Units | Sample #6 | Sample #7 | Sample #8 | Sample #9 |
| MVR, 300° C., 1.2 Kg, 360 s | ASTM D1238, 300° C./1.2 Kg | cm³/10 min | 13.5 | 13.1 | 13.8 | 12 |
| Density | ASTM D 792 | g/cm³ | 1.2698 | 1.2710 | 1.2715 | 1.2725 |
| Notched Impact Strength, 23° C. | ASTM D256 | J/m | 825 | 869 | 895 | 899 |
| HDT, 1.82 MPa, 3.2 mm | ASTM D 648. | ° C. | 118 | 118 | 115 | 114 |
| Flexural Modulus | ASTM D790 | MPa | 2420 | 2370 | 2480 | 2370 |
| Flexural Stress@Yield | ASTM D790 | MPa | 92 | 90.5 | 90.8 | 90.5 |
| Modulus of Elasticity | ASTM D 638 | MPa | 2578 | 2602 | 2620 | 2655 |
| Stress at Yield | ASTM D 638 | MPa | 56.9 | 57.3 | 57.5 | 58.7 |
| Stress at Break | ASTM D 638 | MPa | 47.6 | 50.8 | 50.6 | 48.6 |
| Elongation at Break | ASTM D 638 | % | 53.4 | 69.9 | 62.7 | 57.2 |
| V-0/0.6 mm, 23° C., 48 hr | UL-94 | P(FTP) | — | — | — | 0.999 |
|  | UL-94 | avg t2, s | — | — | — | 3.5 |
| UL comments | UL-94 |  | — | — | — | passed |
| V-0 @ 0.6 mm, 70° C., 168 hr | UL-94 | P(FTP) | — | — | — | 1 |
|  | UL-94 | avg t2, s | — | — | — | 3.82 |
| UL comments | UL-94 |  | — | — | — | passed |
| V-0 @ 0.75 mm, 23° C., 48 hr | UL-94 | P(FTP) | 0.026 | 0.046 | 0.765 | 0.999 |
|  | UL-94 | avg t2, s | 8.14 | 8.76 | 2.83 | 3.35 |
| UL comments | UL-94 |  | failed | failed | passed | passed |
| V-0 @ 0.75 mm, 70° C., 168 hr | UL-94 | P(FTP) | 0.229 | 0.363 | 0.9 | 1 |
|  | UL-94 | avg t2, s | 5.98 | 5.06 | 2.67 | 3.26 |
| UL comments | UL-94 |  | failed | failed | passed | passed |

Table 6 shows that the samples of the disclosed flame retardant composition show excellent flame retardancy at thicknesses of 0.6 millimeter or greater. As can be seen from the Table 6, the sample having a thickness of 0.6 millimeter or greater show p(FTP) values of 0.999 to 100. The samples also display a flame retardancy of V-0 when aged for 48 to 168 hours after manufacturing.

The probability of a first time pass of attaining V-0 as per UL-94 protocols is greater than or equal to 90% for samples comprising the disclosed flame retardant composition having a thickness of 0.60 millimeter or greater, when the sample contains 3 wt % of greater of the phenoxyphosphazene.

In an embodiment, the probability of a first time pass of attaining V-0 as per UL-94 protocols is greater than or equal to 92%, specifically greater than or equal to 94%, specifically greater than or equal to 96%, and more specifically greater than or equal to 99%, for samples comprising the disclosed flame retardant composition having a thickness of 0.75 millimeter or greater, when the sample contains 3 wt % of greater of the phenoxyphosphazene.

The samples of the disclosed flame retardant composition also show an impact strength of greater than or equal to 900 joules per meter, specifically greater than or equal to 1000 joules per meter, and more specifically greater than or equal to 1150 joules per meter, when tested as per ASTM D 256 at 23° C.

The composition disclosed herein may be advantageously used to manufacture a variety of different articles such as computer housings, housings for electronic goods such as televisions, cell phones, tablet computers, automotive parts such as interior body panels, parts for aircraft, and the like.

It is to be noted that all ranges detailed herein include the endpoints. Numerical values from different ranges are combinable.

The transition term comprising encompasses the transition terms "consisting of" and "consisting essentially of."

The term "and/or" includes both "and" as well as "or." For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A flame retardant composition comprising:
   20 to 80 weight percent of a polycarbonate composition; where the polycarbonate composition is selected from the group consisting of a linear polycarbonate, a branched polycarbonate, a combination of a linear and a branched polycarbonate, a blend of two polycarbonate homopolymers; a copolyestercarbonate, and a polysiloxane-polycarbonate polymer;
   1 to 20 weight percent of a laser activatable additive; the laser activatable additive being operative to plate the flame retardant composition upon being activated by a laser; where the laser direct structuring additive is a copper chromium oxide spinel, a copper salt, a copper hydroxide phosphate, a copper phosphate, a copper sulfate, a cuprous thiocyanate, a spinel based metal oxide, a copper chromium oxide, an organic metal complex, a palladium/palladium-containing heavy metal complex, a metal oxide, a metal oxide-coated filler, antimony doped tin oxide coated on mica, a zinc containing metal oxide, a tin containing metal oxide, a magnesium containing metal oxide, an aluminum containing metal oxide, a gold containing metal oxide, a silver containing metal oxide, or a combination comprising at least one of the foregoing laser direct structuring additives; and 3 to 20 weight percent of a phosphazene compound; where all weight percents are based on the total weight of the flame retardant composition, where the composition when molded displays a flame retardancy of V-0 at a sample thickness of 0.6 millimeters when tested per a UL-94 protocol.

2. The flame retardant composition of claim 1, further comprising a mineral filler in an amount of 1 to 10 weight percent based on the total weight of the flame retardant composition.

3. The flame retardant composition of claim 1, comprising 3 to 5 weight percent of the phosphazene compound.

4. The flame retardant composition of claim 1, where the polycarbonate composition comprises a polycarbonate having a weight average molecular weight of 15,000 to 40,000 Daltons.

5. The flame retardant composition of claim 4, where the polycarbonate composition comprises a blend of two polycarbonate homopolymers one of which has a higher molecular weight than the other.

6. The flame retardant composition of claim 1, further comprising 1 to 15 wt % of a pigment.

7. The flame retardant polycarbonate composition of claim 1, where the phosphazene compound has the structure of formula (23)

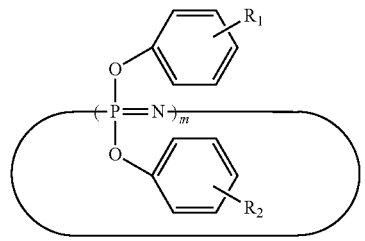

(23)

where in the formula (23), m represents an integer of 3 to 25, $R_1$ and $R_2$ are the same or different and are independently a hydrogen, a hydroxyl, a $C_{7-30}$ aryl group, a $C_{1-12}$ alkoxy, or a $C_{1-12}$ alkyl.

8. The flame retardant polycarbonate composition of claim 1, where the phosphazene compound is hexaphenoxy cyclotriphosphazene, octaphenoxy cyclotetraphosphazene, decaphenoxy cyclopentaphosphazene, or a combination comprising at least one of the foregoing phosphazene compounds.

9. The flame retardant polycarbonate composition of claim 1, where the phosphazene compound has the structure of formula (24) below:

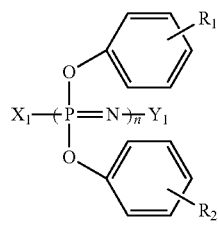

(24)

where in the formula (24), $X^1$ represents a —N═P(OPh)$_3$ group or a —N═P(O)OPh group, $Y^1$ represents a —P(OPh)$_4$ group or a —P(O)(OPh)$_2$ group, Ph represents a phenyl group, n represents an integer from 3 to 10000, $R_1$ and $R_2$ are the same or different and are independently a hydrogen, a hydroxyl, a $C_{7-30}$ aryl, a $C_{1-12}$ alkoxy, or a $C_{1-12}$ alkyl.

10. The flame retardant polycarbonate composition of claim 1, where the phosphazene compound is a crosslinked phenoxyphosphazene.

11. The flame retardant polycarbonate composition of claim 1, where the phosphazene compound has a structure represented by the formula (26)

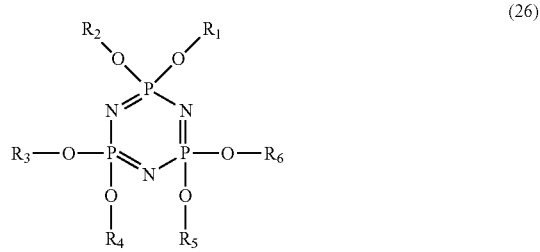

(26)

where $R_1$ to $R_6$ can be the same of different and can be an aryl group, an aralkyl group, a $C_{1-12}$ alkoxy, a $C_{1-12}$ alkyl, or a combination thereof.

12. The flame retardant polycarbonate composition of claim 1, where the phosphazene compound has a structure represented by the formula (27)

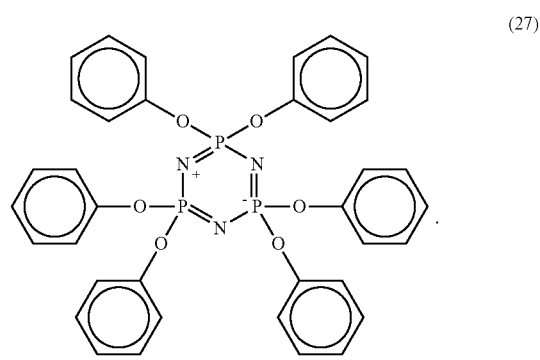

(27)

13. The flame retardant polycarbonate composition of claim 1, further comprising a glass fiber; where the glass fiber is a flat glass fiber.

14. The flame retardant polycarbonate composition of claim 2, where the mineral filler is mica, talc, calcium carbonate, dolomite, wollastonite, barium sulfate, silica, kaolin, feldspar, or a combination comprising at least one of the foregoing mineral fillers.

15. The flame retardant polycarbonate composition of claim 1, further comprising a flame retardant synergist; where the flame retardant synergist is talc having an average particle size of 1 to 3 micrometers.

16. The flame retardant polycarbonate composition of claim 1, displaying an impact strength of greater than or equal to 900 joules per meter, when tested as per ASTM D 256 at 23° C.

17. A method comprising:
blending 20 to 80 weight percent of a polycarbonate; 1 to 20 weight percent of a laser activatable additive; the laser activatable additive being operative to plate the flame retardant composition upon being activated by a laser; where the laser direct structuring additive is a copper chromium oxide spinel, a copper salt, a copper hydroxide phosphate, a copper phosphate, a copper sulfate, a cuprous thiocyanate, a spinel based metal oxide, a copper chromium oxide, an organic metal complex, a palladium/palladium-containing heavy metal complex, a metal oxide, a metal oxide-coated filler, antimony doped tin oxide coated on mica, a zinc containing metal oxide, a tin containing metal oxide, a magnesium containing metal oxide, an aluminum containing metal oxide, a gold containing metal oxide, a silver containing metal oxide, or a combination comprising at least one of the foregoing laser direct structuring additives; and 3 to 20 weight percent of a phosphazene compound to produce a flame retardant composition; where all weight percents are based on the total weight of the flame retardant composition; and extruding the flame retardant composition, where the composition displays a flame retardancy of V-0 at a sample thickness of 0.6 millimeters when tested per a UL-94 protocol.

18. The method of claim 17, further comprising blending a mineral filler.

19. The method of claim 17, further comprising molding the composition.

20. An article manufactured from the composition of claim 1.

* * * * *